United States Patent [19]

Moteki

[11] Patent Number: 4,855,363
[45] Date of Patent: Aug. 8, 1989

[54] CROSSLINKABLE POLYMER COMPOSITION

[75] Inventor: Yoshihiro Moteki, Oita, Japan

[73] Assignee: Showa Denko Kabushiki Kaisha, Tokyo, Japan

[21] Appl. No.: 96,431

[22] Filed: Sep. 15, 1987

Related U.S. Application Data

[63] Continuation of Ser. No. 734,230, May 15, 1985, abandoned.

[30] Foreign Application Priority Data

May 15, 1984 [JP] Japan .................................. 59-95628

[51] Int. Cl.$^4$ ...................... C08L 33/14; C08L 33/04; C08L 33/02; C08L 29/02
[52] U.S. Cl. .................................. 525/207; 525/196; 525/208; 525/217; 525/221; 525/223; 525/225; 525/231; 525/913
[58] Field of Search ............... 525/913, 221, 208, 196, 525/57, 207, 217, 223

[56] References Cited

U.S. PATENT DOCUMENTS

| | | | |
|---|---|---|---|
| 2,773,050 | 12/1956 | Caldwell et al. | 525/58 |
| 3,236,914 | 2/1966 | Murdock et al. | 525/931 |
| 3,299,176 | 1/1967 | Longworth | 525/192 |
| 3,888,943 | 6/1975 | Labana et al. | 260/836 |
| 3,932,692 | 3/1976 | Hirata et al. | 428/474 |
| 4,528,329 | 7/1985 | Inoue et al. | 525/74 |
| 4,555,546 | 11/1985 | Patel | 525/194 |
| 4,575,532 | 3/1986 | Schmukler et al. | 525/57 |

FOREIGN PATENT DOCUMENTS

| | | |
|---|---|---|
| 1493043 | 7/1967 | France . |
| 2275522 | 1/1976 | France . |
| 58-198529 | 11/1983 | Japan . |

Primary Examiner—Carman J. Seccuro
Attorney, Agent, or Firm—Sughrue, Mion, Zinn, Macpeak & Seas

[57] ABSTRACT

A crosslinkable polymer composition comprising:
(I) 1% to 99% by weight of at least one olefin copolymer selected from the group consisting of:
 (A) copolymers composed of (i) α-olefins, (ii) unsaturated dicarboxylic acid anhydrides, and (iii) at least one compound selected from the group consisting of unsaturated carboxylic acid esters, and vinyl esters;
 (B) copolymers at least composed of olefins and unsaturated monocarboxylic acids;
 (C) copolymers obtained by saponifying and neutralizing olefin copolymers at least composed of olefins and unsaturated carboxylic esters; and
 (D) copolymers at least composed of olefins and unsaturated dicarboxylic acids or the half esters thereof; and
(II) 99% to 1% by weight of at least one olefin copolymer selected from the group consisting of:
 (A) copolymers at least composed of olefins and glycidyl alkyl (meth) acrylates; and
 (B) copolymers composed of (i) at least one α-olefin, (ii) at least one compound selected from unsaturated carboxylic acid esters and vinyl esters, and (iii) at least one compound having a hydroxyl group or primary or secondary amino group in the side chain.

The resultant crosslinkable polymer composition has excellent molding and processing characteristics and can provide crosslinked products having excellent heat resistance and adhesion properties.

11 Claims, 4 Drawing Sheets

CROSSLINKABLE POLYMER COMPOSITION

This is a continuation of application Ser. No. 734,230, filed May 15, 1985, now abandoned.

BACKGROUND OF THE INVENTION

1. Field of the Invention

The present invention relates to a crosslinkable polymer composition. More specifically, it relates to a crosslinkable polymer composition capable of providing a polymeric material having both excellent heat resistance and excellent adhesion to metal properties.

2. Description of the Related Art

Known adhesive thermoplastic polymer compositions containing thermoplastic polymers having an alcoholic hydroxyl group in the molecule thereof and epichlorohydrin polymers have a limited heat resistance due to an unsatisfactory thermoplasticity and the presence of chlorine. In addition, practical use of the above-mentioned polymer compositions is limited because the chlorine contained in the compositions causes inherent problems from a sanitary viewpoint and pollutional problems due to the generation of poisonous gases when such compositions are incinerated, and also because the epichlorohydrin polymers are expensive.

In addition, polymer compositions comprising polyvinyl alcohols having a saponification degree of 85% or less and olefin copolymers containing 10% by weight or less of copolymerized unsaturated carboxylic acid or the anhydride thereof have been proposed in, for example, Japanses Unexamined Patent Publication (Kokai) No. 55-127450. However, these polymer compositions are heat retaining resin compositions which are developed to improve the uniform dispersibility of the heat retaining polyvinyl alcohols and olefin copolymers, and cannot be used as an adherent resin or crosslinkable resin.

Furthermore, packaging resin compositions comprising ethylene-vinyl acetate copolymers and copolymers of olefins and unsaturated carboxylic acids, unsaturated dicarboxylic acids, or unsaturated dicarboxylic acid derivatives or the derivatives thereof have been proposed in, for example, Japanese Unexamined Patent Publication (Kokai) No. 52-62382. However, although these resin compositions are suitable for use as moisture-resistant packaging materials, because they have desired gas barrier properties but are readily cut by means of a cutter, they are not suitable for use as adhesive resin compositions or crosslinkable polymer compositions.

Recently, polymeric materials having good heat resistance and also excellent adhesion to, for example, metals, are strongly desired, in particular, in the electrical and electronic equipment fields. Various polymeric materials having good adhesion to, for example, metals, at an ambient temperature are known in the art. However, polymeric materials having both excellent adhesion properties and excellent heat resistance are not known in the art. Although polyester resins and polyimide resins have been proposed as having good adhesion properties and heat resistance, polyester resins are disadvantageous in that they have high water absorption properties and large thermal expansion coefficients at a temperature of 20° C. to 250° C. Furthermore, polyimide resins are also disadvantageous in that they have insufficient adhesion to, for example, metals, due to the poor surface activity of the resins.

SUMMARY OF THE INVENTION

Accordingly, the objects of the present invention are to eliminate the above-mentioned disadvantages of the polymeric materials and to provide a crosslinkable polymer composition capable of providing a polymeric material having both excellent heat resistance and excellent adhesion to various materials including metals.

Other objects and advantages of the present invention will be apparent from the following description.

In accordance with the present invention, there is provided a crosslinkable polymer composition comprising:

(I) 1% to 99% by weight of at least one olefin copolymer (i.e., "olefin copolymer (I)") selected from the group consisting of:
   (A) copolymers composed of (i) α-olefins, (ii) unsaturated dicarboxylic acid anhydrides, and (iii) at least one compound selected from the group consisting of unsaturated carboxylic acid esters, and vinyl esters (i.e., "copolymer (I-a)";
   (B) copolymers at least composed of olefins and unsaturated monocarboxylic acids (i.e., "copolymer (I-b)");
   (C) copolymers obtained by saponifying and neutralizing olefin copolymers at least composed of olefins and unsaturated carboxylic esters (i.e., "copolymer (I-c)"); and
   (D) copolymers at least composed of olefins and unsaturated dicarboxylic acids or the half esters thereof (i.e., "copolymer (I-d)"); and (II) 99% to 1% by weight of at least one olefin copolymer (i.e., "olefin copolymer (II)") selected from the group consisting of:
   (A) copolymers at least composed of olefins and glycidyl alkyl (meth) acrylates (i.e., "copolymer (II-a)"); and
   (B) copolymers composed of (i) at least one α-olefin, (ii) at least one compound selected from unsaturated carboxylic acid esters and vinyl esters, and (iii) at least one compound having a hydroxyl group or primary or secondary amino group in the side chain (i.e., "copolymer (II-b)").

BRIEF DESCRIPTION OF THE DRAWINGS

The present invention will be better understood from the description set forth below with reference to the accompanying drawings in which.

DESCRIPTION OF THE PREFERRED EMBODIMENTS

Olefin Copolymer (I)

Figure 1:
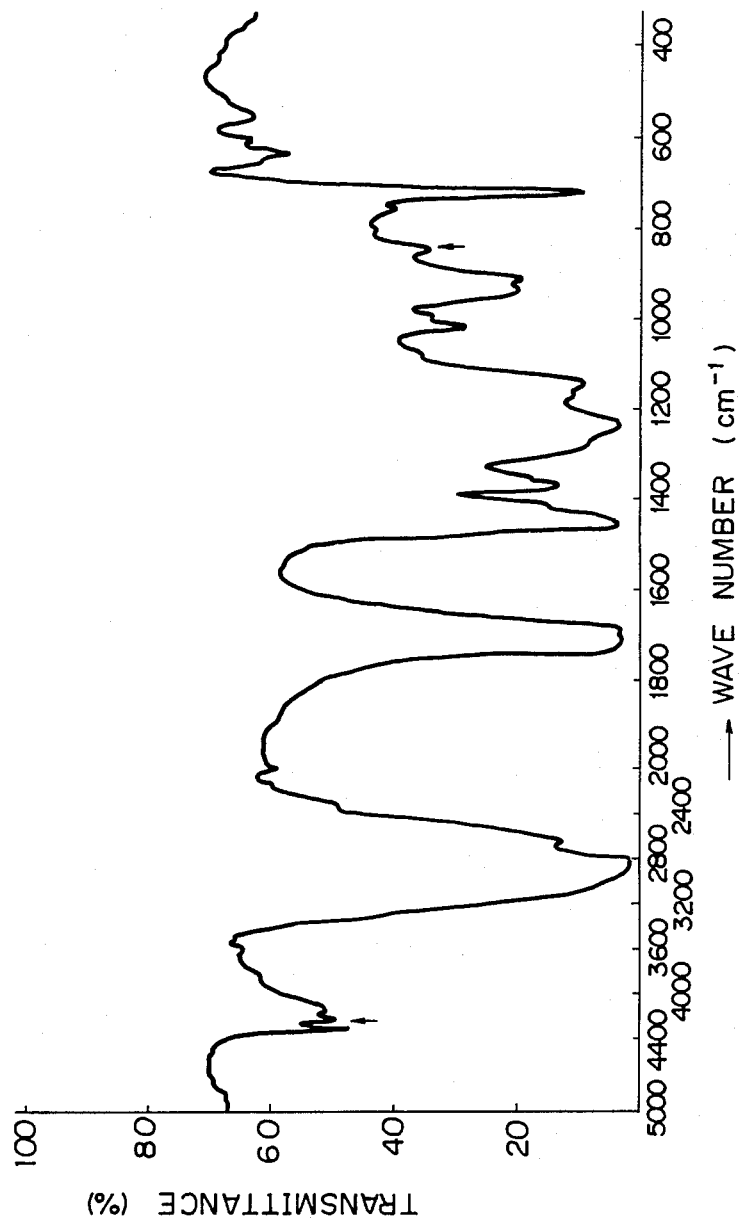
FIG. 1 is an infrared absorption spectrum of the non-crosslinked film of a mixture of copolymer II-a-4 and I-b-2.

The olefin copolymers (I) usable in the crosslinkable polymer composition according to the present invention are those selected from the above-mentioned copolymers (I-a), (I-b), I-c), and (I-d).

Copolymer (I-a)

The copolymers (I-a) usable in the present invention are those which are composed of (i) α-olefins, (ii) unsaturated dicarboxylic acid anhydrides, and (iii) unsaturated carboxylic acid esters, and/or vinyl esters (i.e., "component (I-a-iii)") and which are preferably melted to become flowable at a temperature of 150° C. or less.

The α-olefins usable in the present invention are those having 2 to 12 carbonatoms. Typical examples of such α-olefins are ethylene, propylene, and butene-1. Especially, the use of ethylene is preferable.

The unsaturated dicarboxylic acid anhydrides usable in the present invention are acid anhydrides having 4 to 40, preferably 4 to 35 carbon atoms such as maleic anhydride, tetrahydrophthalic anhydride, 4-methylcyclohex-4-ene-1,2-carboxylic acid anhydride, and bicyclo(2,2,1)hepta-5-ene-2,3-dicarboxylic acid anhydride.

The unsaturated carboxylic acid esters usable in the present invention are those having an ester moiety with 1 to 25, preferably 1 to 20 carbon atoms, preferably, those having good heat stability such as methyl (meth) acrylate and ethyl (meth) acrylate. The use of unsaturated carboxylic acid esters having poor heat stability such as butyl (meth) acrylate is not preferable since foaming is likely to occur.

The vinyl esters usable in the present invention are those having an ester moiety with 1 to 25, preferably 1 to 20 carbon atoms, such as, for example, vinyl acetate and vinyl propionate.

The above-mentioned compounds usable in the preparation of the copolymer (I-a) may be used alone or in any mixture thereof.

The unsaturated dicarboxylic acid anhydrides and the above-mentioned component (I-a-iii) are preferably contained in the copolymer (I-a) within the range represented by the following equations (1) and (2), $$0.7 > \frac{b + c}{a + b + c} > 0.05 \quad (1)$$

$$0.10 > \frac{c}{a - b - c} > 0.004 \quad (2)$$

wherein
a: amount of α-olefin based on unit weight of copolymer (I-a)
b: amount of unsaturated dicarboxylic acid anhydride based on unit weight of copolymer (I-a)
c: amount of component (I-a-iii) based on unit weight of copolymer (I-a)

The copolymer (I-a) can be prepared in any conventional manner. For example, the above-mentioned components (i), (ii), and (iii) of the copolymer (I-a) are radically polymerized at a temperature of 120° C. to 260° C. under an elevated pressure (e.g., 500 to 2500 kg/cm$^2$). Alternatively, the above-mentioned unsaturated dicarboxylic acid anhydrides are graft copolymerized to olefin copolymers of the above-mentioned α-olefins and component (I-a-iii) in the pressure of free radical initiators such as peroxides by means of a mixing device such as a single or twin screw extruder or kneader (or brabender).

The total amount of the components (ii) and (iii) of the copolymer (I-a) in the copolymer (I-a) is preferably in an amount of 5% to 70% by weight based on the total amount of the copolymer (I-a) as mentioned above. The use of the components (ii) and (iii) in the total amount of more than 70% by weight is likely to cause an unpreferable increase in the softening point of the copolymer, which will impair the desired flowability at a temperature of 150° C. or less and also cause an unpreferably increase in the economical cost. Contrary to this, the use of the components (ii) and (iii) in the total amount of less than 5% by weight is likely to cause an increase in the crystalline melting point, which will impair the desired low temperature flowability (or fluidity).

The unsaturated dicarboxylic acid anhydrides act as a crosslinking active point with the copolymers (II-a) or (II-b) and also as an adhesion property providing agent for various substrates. The content of the unsaturated dicarboxylic acid anhydrides in the copolymers (I-a) is preferably 10% by weight or less, more preferably, 0.4% to 10% by weight. The use of the unsaturated dicarboxylic acid anhydrides in an amount of more than 10% by weight tends to result in an increase in the water absorption properties, which requires an unpreferable long period of time for the dewatering and drying and which also tends to unpreferably generate foaming in the products due to the inclusion of the absorbed water or water formed by the dehydration reaction when the copolymer (I-a) is crosslinked with the copolymer (II-a) and (II-b). Furthermore, the product after crosslinking tends to absorb water, thereby decreasing the electric characteristics.

Contrary to this, when the amount of the bound acid anhydride is less than 0.4% by weight, the number of crosslinking points are substantially less even when the comonomer compositions of the copolymer (II-a) or (II-b) or the compositions of the copolymer (I-a) and the copolymer (II-a) or (II-b) are varied. As a result, the desired heat resistance tends to be unpreferably decreased.

Although there is no critical limitation to the melt index (MI) of the copolymer (I-a), the preferable melt index is 0.5 g/10 min or more, more preferably, 5 g/10 min or more, and most preferably, 50 g/10 min, as determined according to an ASTM D 1238 method at a temperature of 190° C. under a load of 2.16 kg. The preferable MI values of the other copolymers used in the present invention are the same as in the MI of the copolymer (I-a).

Copolymer (I-b)

The copolymers (I-b) usable in the present invention are those which are composed of the olefins and unsaturated monocarboxylic acids and which are preferably melted to become flowable at a temperature of 150° C. or less. For this reason, the preferable copolymers (I-b) optionally contain the same third component of the below-mentioned copolymer.

The olefins usable in the preparation of the copolymers (I-b) are those having 2 to 12 carbon atoms and including α-olefins as in the copolymers (I-a). The unsaturated monocarboxylic acids usable in the preparation of the present copolymers (I-b) are those having 2 to 26, preferably 2 to 21 carbon atoms such as, for example, acrylic acid, methacrylic acid, and ethacrylic acid. The copolymer (I-b) can be prepared from the olefins and the unsaturated monocarboxylic acids by the methods as mentioned in the preparation of the above-mentioned copolymer (I-a).

When the above-mentioned optional third component is used, the third component can be preferably used in an amount of 70% by weight or less, more preferably, 10 to 60% by weight, based on the total amount of the copolymer (I-b). Also, when the amount of the third component is more than 70% by weight, the desired characteristic features of the present invention can be obtained. However, the use of the optional third component in an amount of more than 70% by weight is not necessary from the production and economical viewpoints.

The bound unsaturated monocarboxylic acid content in the copolymer (I-b) is preferably 0.1 to 75 mol %, more preferably 0.5 to 15 mole %. Furthermore, the olefin copolymer having 0.1 mole % or more of the unsaturated monocarboxylic acid monomer grafted thereto also can be used as the copolymer (I-b) of the present invention.

The unsaturated monocarboxylic acid acts as a crosslinking reaction point for the below-mentioned copolymers (II) and also as an adhesion property providing agent for various widely-prevailed substrates. Also, for this reason, the use of an excessive amount of the unsaturated monocarboxylic acid is not necessary. The use of too large an amount of the unsaturated monocarboxylic acid tends to result in an unpreferable increase in the water absorption properties, which generates foaming during the molding and which causes an unpreferable decrease in the electrical characteristics. Furthermore, the use of too large an amount of the unsaturated monocarboxylic acid is also disadvantageous in safety, separation, and recovery from the production and economical viewpoints. Contrary to this, the use of too small an amount of the unsaturated dicarboxylic acid tends to cause an unpreferable decrease in the adhesion properties and heat resistance.

Copolymer (I-c)

The copolymers (I-c) usable in the present invention are copolymers which are obtained by saponifying at least a portion of the ester groups of the olefin copolymers composed of the above-mentioned olefins and unsaturated carboxylic acid esters, followed by neutralizing the saponified copolymers by, for example, a metal removal treatment, and which are preferably melted to become flowable at a temperature of 150° C. or less.

The olefins usable in the preparation of the copolymers (I-c) are the same as in the copolymers (I-b). The unsaturated carboxylic acid esters usable in the preparation of the copolymers (I-c) include, for example, methyl (meth) acrylate, ethyl (meth) acrylate, hydroxymethyl (meth) acrylate, and diethyl fumarate.

Although there is no critical limitation to the content of the unsaturated carboxylic acid esters in the copolymers (I-c), the preferable content of the unsaturated carboxylic acid ester is 1 to 25 mole %.

The preferable saponification degree of the ester groups of the copolymers (I-c) is 20% to 80%, depending upon the content of esters. The saponification of the copolymers (I-c) can be carried out in any conventional manner. For example, the copolymers having ester groups are added, together with NaOH, to a mixed solvent of toluene and isobutyl alcohol (50:50) and the mixture is refluxed for, for example, 3 hours. The saponification degree can be controlled by the amount of NaOH. Further, the saponified product can be precipitated by the addition of water or an alcohol. The solvent is separated by filtration and the resultant product can be vacuum-dried overnight at a temperature of 50° C. The polymer is dispersed in water and sulfuric acid is added thereto. The mixture is agitated at a temperature of 70° C. for 1 hour to effect the metal removal treatment (i.e., neutralizaton reaction). Thus, the desired olefin copolymers (I-c) can be obtained.

Copolymer (I-d)

The copolymers (I-d) usable in the present invention are those composed of olefins and saturated dicarboxylic acids or the half esters thereof and, optionally, the third component of the below-mentioned copolymer (II-b) (or the above-mentioned copolymer (I-a)) and preferably melted at a temperature of 150° C. or less. These copolymers can be preferably prepared by copolymerizing the olefins and unsaturated carboxylic acid anhydrides and, optionally, the third component and then modifying the resultant copolymers having acid anhydride groups to convert a portion or all of the acid anhydride groups into the half ester groups or dicarboxylic acid groups.

The olefins usable in the preparation of the copolymers (I-d) are the same as in the copolymers (I-b). The unsaturated carboxylic acids anhydrides usable in the preparation of the copolymers (I-d) are maleic anhydride, tetrahydrophthalic anhydride, anhydride, 4-methylcyclohexa-4-ene-1,2-carboxylic acid anhydride, and bicyclo(2,2,1)-hepta-5-ene-2,3-dicarboxylic acid anhydride.

When the above-mentioned optional third component is used, the third component can be preferably used in an amount of 70% by weight or less, more preferably, 10 to 60% by weight, based on the total amount of the copolymer (I-d). Also, when the amount of the third component is more than 70% by weight, the desired characteristic features of the present invention can be obtained. However, the use of the optional third component in an amount of more than 70% by weight is not necessary from the production and economical viewpoints.

The bound acid anhydride content in the copolymer (I-d) is preferably 0.1 to 75 mol %, more preferably, 0.5 to 15 mol %. Furthermore, the olefin copolymers of the α-olefins and the optional third component, having 0.1 mol % or more of the acid anhydride group grafted thereto, also can be used as the copolymer (I-d) of the present invention.

The above-mentioned acid anhydride groups act as a crosslinking reaction point for the below-mentioned copolymers (II) and also as an adhesion property providing agent for various prevailed substrates. Thus, the use of an excessive amount of the acid anhydride groups is not necessary for either of the above-mentioned reasons.

As mentioned above, the olefin copolymers (I-d) used in the present invention are prepared by modifying the acid anhydride groups of the above-mentioned copolymers. The modification is carried out by hydrolysis and/or by half esterification with an alcohol. Examples of the alcohols usable in the half esterification are primary alcohols preferably those having 1 to 25, more preferably 1 to 20 carbon atoms such as methanol, ethanol, propanol, and butanol.

Although the preparation of the olefin copolymers (I-d) by the modification of the olefin copolymers having the acid anhydride group is explained above, the copolymers (I-d) can be prepared directly from, for example, α-olefins, alkyl (meth) acrylates, unsaturated carboxylic acid anhydrides (e.g., maleic anhydride), and unsaturated carboxylic acid esters (e.g., maleic acid esters), without modifying the acid anhydride groups.

Olefins Copolymer (II)

The olefin copolymers (II) usable in the crosslinkable polymer composition according to the present invention are those selected from the above-mentioned copolymers (II-a) and (II-b).

Copolymer (II-a)

The copolymers (II-a) usable in the present invention are those which are at least composed of olefins and glycidyl alkyl (meth) acrylates and which are preferably melted to become flowable at a temperature of 150° C. or less. The copolymers (II-a) may optionally or preferably contain a third component such as, for example, unsaturated carboxylic acid esters or vinyl esters.

The olefins usable in the preparation of the copolymers (II-a) are those having 2 to 12 carbon atoms such as ethylene, propylene, and butene-1. The most preferable olefin is ethylene.

The glycidyl alkyl (meth) acrylates usable in the present invention are those having the general formula:

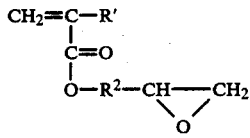

wherein $R'$ is H or a methyl group, $R^2$ is a linear or branched alkyl group having 1 to 12 carbon atoms. Examples of such glycidyl alkyl (meth) acrylates are monoglycidyl butene tricarboxylate, glycidyl methacrylate, glycidyl acrylate, glycidyl ethacrylate, and glycidyl itaconate.

Although there is no critical content of the epoxy-containing monomer in the copolymer, the preferable content of the glycidyl alkyl (meth) acrylates is 0.1 to 17 mol % in the total amount of the copolymers from the viewpoint of the adhesion properties and heat resistance. When the glycidyl alkyl (meth) acrylate is used in too small an amount, not only are the adhesion properties not sufficiently improved but also the desired sufficient heat resistance cannot be obtained even when the compositions of the copolymers (I) and the reaction conditions are appropriately adjusted. Contrary to this, when the glycidyl alkyl (meth) acrylate is used in too large an amount, the water absorption properties of the resultant are unpreferably increased. As a result, foaming is generated during the molding and water is absorbed after the molding. The above-mentioned foaming and water absorption cause an unpreferable decrease in the electrical characteristics. Furthermore, the use of too large an amount of the glycidyl alkyl (meth) acrylate is also disadvantageous in safety, separation, and recovery from the production and economical viewpoints.

The olefin copolymers of the olefins and the above-mentioned optional third component containing, for example, 0.1 mol % or more of the glycidyl alkyl (meth) acrylate grafted thereto, also can be used as copolymers (II-a) in the present invention.

The unsaturated carboxylic acid esters usable in the preparation of the copolymer (II-a) are those having an ester moiety with 1 to 25, preferably 1 to 20 carbon atoms such as, for example, methyl (meth) acrylate and ethyl (meth) acrylate the use of these (meth) acrylates is preferable from the viewpoint of heat stability. For instance, the use of alkyl (meth) acrylate having insufficient heat stability such as t-butyl (meth) acrylate is not preferable because it tends to cause foaming.

The vinyl esters usable in the preparation of the copolymer (II-a) are those having an ester moiety with 1 to 25, preferably 1 to 20 carbon atoms such as, for example, vinyl acetate and vinyl propionate.

The copolymers (II-a) can be prepared in any conventional manner. For example, the above-mentioned comonomers are radically polymerized at a temperature of 120° C. to 260° C. under an elevated pressure (e.g., 500 to 2500 kg/cm²). Alternatively, the copolymers of the above-mentioned α-olefins and the above-mentioned third component are graft copolymerized with the glycidyl alkyl (meth) acrylates in the presence of a free radical initiator, such as peroxide, by means of a mixing device such as a single or twin screw extruder or kneader (or brabender).

The total amount of the above-mentioned third component and the glycidyl alkyl (meth) acrylate is preferably in an amount of 5% to 70% by weight, based on the total amount of the copolymers (II-a). The use of the third component and the glycidyl alkyl (meth) acrylate in a total amount of more than 70% by weight is likely to cause an unpreferable increase in the softening point of the copolymers, which will inpair the desired flowability at a temperature of 150° C. or less and also cause an unpreferable increase in the economical cost. Contrary to this, the use of the third component and the glycidyl alkyl (meth) acrylate in a total amount of less than 5% by weight is likely to cause an unpreferable increase in the crystalline melting point, which will impair the desired low temperature flowability (or fluidity).

The glycidyl alkyl (meth) acrylates act as a crosslinking active point with the copolymers (I-a), the copolymers (I-b), the copolymers (I-c), or the copolymers (I-d), and also as an adhesion property providing agent for various substrates. The content of the bound glycidyl alkyl (meth) acrylates in the copolymers (II-a) is preferably 0.1 mole % or more, more preferably, 0.1 mole % to 17 mole %. The use of too small an amount of the glycidyl alkyl (meth) acrylates in the preparation of the copolymers (II-a), and the number of the desired crosslinking points will substantially decrease and, therefore, the heat resistance is unpreferably decreased, even when the comonomer compositions of the above-mentioned copolymers (I-a), (I-b), (I-c), and/or (I-d) are appropriately adjusted or when the compounding ratio of the above-mentioned copolymers (II-a) with the above-mentioned copolymers (I-a), (I-b), (I-c), and/or (I-d) is appropriately adjusted.

Copolymer (II-b)

The copolymers (II-b) usable in the present invention are those which are composed of (i) the α-olefins, (ii) at least one compound having an activated hydrogen such as (i.e., the second component) a hydroxyl group or primary or secondary amino group in the side chain, and (iii) unsaturated carboxylic acid esters and/or vinyl esters (i.e., "the third component"). The copolymers (II-b) are preferably melted to become flowable at a temperature of 150° C. or less.

The α-olefins usable in the preparation of the copolymers (II-b) are the same as those in the preparation of the copolymers (I-a).

The second components usable in the preparation of the copolymers (II-b) are hydroxyalkyl (meth) acrylates such as hydroxymethyl (meth) acrylate, hydroxyethyl (meth) acrylate, hydroxypropyl (meth) acrylate, and hydroxybutyl (meth) acrylate; α-alkenyl alcohols such as allyl alcohol; vinyl alcohols which may be also obtained by saponifying vinyl ester copolymers after copolymerization to thereby introduce vinyl alcohol units into the copolymer chains; α-alkenyl amines such as allyl amine; and primary or secondary aminoalkyl (meth) acrylates such as aminoethyl (meth) acrylate.

The preparation of the copolymers (II-b) can be carried out by radically copolymerizing the above-mentioned α-olefins, the second components, and the third components in the same way as in the copolymers (I-a).

The content of the third component in the copolymers (II-b) is preferably 0% to 70% by weight, more preferably, 10% to 60% by weight, although there is no critical limitation to the content of the third component. When the content of the third component is more than 70% by weight, the desired characteristic features of the present invention can be obtained. Moreover, the use of the third component in an amount of more than 70% by weight is not necessary or preferable from the production and economical viewpoints.

The content of the second component in the copolymers (II-b) is preferably 0.1 to 75 mol %, more preferably, 1 to 30 mol %, and especially, 1.5 to 15 mol %, although there is no critical limitation to the content of the second component. The second component acts as a crosslinking reaction point for the above-mentioned copolymers (I) and also acts as an adhesion property providing agent for various widely-prevailed substrates. For these reasons, the use of an expensive amount of the second component of the copolymers (II-b) is not necessary. The use of too large an amount of the second component tends to unpreferably increase the water absorption properties of the copolymers, which generates unpreferable foaming during the molding. For this reason, and also because the molded articles are susceptible of water absorbing, adverse affects such as a decrease in the electrical characteristics of the molded articles are caused. Furthermore, the use of too large an amount of the second component is also disadvantageous in safety, separation, and recovery from the production and economical viewpoints. Contrary to this, the use of the second component tends to cause an unpreferable decrease in the heat resistance although a good adhesion property can be obtained.

Preparation of Polymer Composition

The crosslinkable composition according to the present invention can be prepared by uniformly mixing one or more of the above-mentioned copolymers (I) selected from the group consisting of the above-mentioned copolymers (I-a), (I-b), (I-c), and (I-d) with one or more of the above-mentioned copolymers (II) selected from the group consisting of the above-mentioned copolymers (II-a) and (II-b), in any conventional manner known in the art.

For example, the copolymers can be dry blended. Namely, the mixing can be carried out by dry blending the copolymers in a mixer such as a Henschel mixer conventionally used as a mixing means in olefin polymer, fields, or by melt blending the copolymers in a mixing device such as Banbury mixer, a single or twin screw extruder, or a roller mill. In addition, the copolymers may be first dry blended and the resultant mixture melt blended. Furthermore, more homogeneous blends can be obtained by using a static mixer at the screw tip of an extruder.

It should be noted, however, that when the copolymers (I) and (II) are blended in molten conditions, the blending must be carried out in conditions such that no substantial crosslinking reaction between the copolymers (I) and (II) occurs. It will be understood that, if the crosslinking reaction occurs during the blending, the desired homogeneous blend cannot be obtained. As a result, not only are the molding properties during molding and processing of the resultant composition worsened, but also the shapes and the heat resistance of the molded articles after crosslinking are unpreferably decreased. For this reason, the melt blending of the copolymers (I) and (II) is preferably carried out at a temperature of 25° C. (i.e., room temperature) to 150° C., especially, up to 140° C., although the temperature depends upon the melt viscosity of the copolymers (I) and (II) at a blending temperature. Consequently, the softening temperatures or normal crystalline melting points of the olefin copolymers (I) and (II) are preferably 120° C. or less, more preferably, 100° C. or less, and the convenient flowability thereof is as large as possible.

The blending ratio by weight of the copolymer (I) to the copolymer (II) should be from 99:1 to 1:99, preferably, 98:2 to 2:98, and more preferably, 5:95 to 95:5. Furthermore, since homogeneous compositions are not likely to be obtained when the compounding ratios of the copolymers (I) and (II) are largely different or when the difference in the melt viscosities of the copolymers (I) and (II) is large, the desired polymer compositions can be preferably obtained by blending the copolymers in such a manner that the melt viscosities thereof are close or similar, or by preparing a master batch at an elevated temperature having the composition ratio of about 1:1, followed by an appropriate diluting.

In the practice of the preparation of the crosslinkable polymer compositions according to the present invention, any conventional ingredients or additives conventionally used in olefin polymer fields, such as, for example, antioxidants, ultraviolet absorbers, foaming agents, foaming auxiliaries, metal deterioration inhibitors, flame retardants, tackifiers, and so on, can be used as long as the desired characteristics of the present composition are not adversely affected.

Production process of Crosslinked Product (or Crosslinked Polymer)

The crosslinkable polymer compositions obtained as mentioned above can be molded or cast upon heating to obtain the molded crosslinked polymer products. Furthermore, the crosslinkable polymer compositions according to the present invention are first film-extruded through, for example, a T-die film extruder, and then the thus-obtained film can be adhered on one or both surfaces of various substrates such as aluminum, paper, cellophane, copper, polyimide resin film, PET, PBT, nylon, and polysulfone by applying the above-mentioned film to these substrates, followed by heating. Alternatively, the crosslinkable polymer compositions according to the present invention are formed into sheets having an appropriate thickness by means of rolls or calendar rolls, and then the sheets are sandwiched between the substrate to which they are to be adhered, followed by being pressed upon heating at an elevated temperature. Furthermore, the crosslinkable polymer compositions according to the present invention are subjected to two-layered or multi-layered lamination in a conventional extrusion lamination method, and then the laminates can be treated upon heating at an elevated temperature to thereby obtain the composite materials having a high heat resistance and strong adhesion property.

The crosslinked film of the present compositions also can be prepared on the series of rolls having different roll temperatures (e.g., from a low temperature through 230° C. to 240° C.) by laying the films on the rolls under some tension, followed by gradually raising the temperatures. Alternatively, the crosslinked film or sheet of the present crosslinkable polymer composition can be obtained by sandwiching the non-crosslinked T-die film or sheet formed as mentioned above between, for example, Teflon sheets, followed by subjecting them to a heat press treatment. The above-mentioned crosslinked film has good adhesion properties even though it is crosslinked. Accordingly, the crosslinked film can be applied to various substrates and can be strongly adhered to the substrates upon heating. Of course, the crosslinked film has a remarkably high heat resistance.

Furthermore, the crosslinked foamed film or sheet can be prepared by blending foaming agents to the compositions when blending. Heat resistant crosslinked foaming composite materials (sandwiched type) also can be prepared by applying substrates to both surfaces of the crosslinked foamed film or sheet, without using an adhesive. The crosslinkable polymer compositions according to the present invention can be also used to form pipes.

The heating temperature for the crosslinking is generally 155° C. or more, preferably, 170° C. or more, although the temperature depends upon the comonomer compositions of the olefin copolymers (I) and/or (II). Although the crosslinking time is largely varied, depending upon the crosslinking temperature and the compounding composition s of the olefin copolymers (I) and (II), the crosslinking time is within the range of several seconds to several hours.

In order to sufficiently exhibit the desired adhesion properties and heat resistance of the crosslinked polymer obtained from the present crosslinkable compositions, the gel content of the crosslinked products of the copolymers (I) and (II) is preferably 10% or more, more preferably, 50% or more, and especially, 70% or more.

The gelation ratio is determined as follows. The crosslinked polymer sample is placed in 300 mesh wire cloth and the sample is subjected to a Soxhlet extraction for 6 hours with boiled toluene. Thereafter, the remaining sample in the wire cloth is dried at a temperature of 80° C. for 16 hours and then the weight of the dried sample is measured with the wire cloth. The remaining sample weight is calculated from the total weight of the sample and the wire cloth. The gelation rate is determined by weight%.

The flow index of the crosslinked polymer is 0.01 g/10 min or less.

As mentioned above, according to the present invention, non-crosslinked polymer compositions having good flowability and excellent moldability can be obtained. These crosslinkable polymer compositions can readily provide various molded or formed articles such as films, sheets, and pipes.

Furthermore, the crosslinked polymer obtained from the present crosslinkable polymer composition has excellent electrical insulating properties as in conventional thermoplastic resins. The most characteristic features or effects of the present invention reside in the heat resistance and adhesion properties, as follows.

(1) Regarding the heat resistance, discoloration, foaming, and deformation do not occur generally at a temperature of 300° C. or more, even at a temperature of 360° C. or more for a short period of time.

(2) Regarding the adhesion properties, if the present non-crosslinked composition or the precursors (e.g., film, sheet) obtained therefrom is crosslinked upon heating by being placed in close contact with the substrates, the film or sheet according to the present invention will strongly adhere to the substrates. Examples of such substrates are metals and alloys such as aluminum, copper, iron, stainless steel, brass, galvanized iron, and tin plate, glass, ceramics, amide resins, imide resins, polysulfone, polyesters, polycarbonates, polyurethanes, cellophane, various papers, and modified synthetic resins having polar groups such as modified polyolefins obtained by, for example, grafting monomers having polar groups to polyolefins.

Consequently, the crosslinkable polymer compositions according to the present invention and the crosslinked products thereof can be practically and effectively utilized in various fields due to the above-mentioned advantageous characteristics.

The crosslinked polymer according to the present invention have, in addition to the heat resistance and the adhesion properties, excellent electrical characteristics such as large electrical insulating properties (e.g., volume and surface resistivity) and low dielectric constant and dielectric loss tangent, excellent chemical resistance such as water resistance, organic solvent resistance, acid resistance and alkali resistance of the adhesion strength, excellent heat cycle resistance and boiling resistance (or water-vapor resistance), excellent etching characteristics, and excellent plating characteristics. Consequently, the crosslinkable polymer composition or crosslinked polymer derived therefrom according to the present invention can be advantageously utilized in various electrical machinery and apparatus and electronic equipment such as electronic materials (e.g., laminated plates for print substrates and flexible circuit plates). Furthermore, the crosslinked polymer can be utilized as raw materials for automobile parts in which the heat resistance and the adhesion properties are required.

EXAMPLES

The present invention will now be further illustrated by, but is by no means limited to, the following Examples, wherein "percents" are all by weight unless otherwise specified.

Example 1 and Comparative Example 1

Various olefin copolymers (I) and (II) listed in Table 1 were melt mixed in a weight ratio of 50:50 or 70:30 by using a single screw type extruder having a cylinder diameter of 30 mm at a temperature of less than 140° C. to prepare polymer compositions. The details and physical properties of the copolymers (I) and (II) are shown in Table 1.

From the polymer compositions obtained above, films were prepared by using a T-die film extruder having a cylinder diameter of 40 mm. The temperature of the $C_1$, $C_2$, and $C_3$ portions of the cylinder and the die temperature were set at 110° C., 115° C., 120° C., and 125° C., respectively. Thus, clear films having a thickness of 60 to 100 μm and containing no gels and fish eyes were obtained.

The films obtained above were applied to aluminum foils having a thickness of 70 μm and were pressed under a presure of 20 kg/cm² at a temperature of 160° C., 180° C., or 240° C. with a preheating time of 1.5 minutes and various press times listed in Table 2. Thus, adhered plates having a thickness of 1.5 mm were obtained. The adhesion strength (i.e., T-peel strength) of the adhered plates at room temperature as determined according to JIS K-6854 was remarkably high as shown in Table 2. The gellation (%) of each sample is also shown in Table 2.

Furthermore, the above-mentioned non-crosslinked T-die film was placed between two Teflon sheets and was pressed in the same manner as mentioned above at a temperature of 160° C., 180° C., or 240° C. Thus, laminated sheets having a thickness of 1.5 mm was prepared. These laminated sheets were dipped in a molten solder bath at a temperature of 200° C., 250° C., 300° C. or 350° C. for 3 to 30 minutes and, thereafter, the conditions of the films were observed. The results were as shown in Table 2.

TABLE 1

| Sample No. | MI*3 | Second Comonomer | | | | | | Third Comonomer | |
|---|---|---|---|---|---|---|---|---|---|
| | | Kind | Amount (mol %) | Saponification*1 (%) | Neutralization*2 (%) | Hydrolysis (%) | Half-esterization (%) | Kind | Amount (mol %) |
| Copolymer II-a | | | | | | | | | |
| II-a-1 | 137 | Glycidyl methacrylate | 2.2 | | | | | Methyl methacrylate | 7.0 |
| II-a-2 | 200 | " | 4.5 | | | | | Ethyl acrylate | 5.4 |
| II-a-3 | 12.5 | " | 2.2 | | | | | Vinyl acetate | 1.8 |
| II-a-4 | 7.0 | " | 2.3 | | | | | " | 1.8 |
| Copolymer I-b | | | | | | | | | |
| I-b-1 | 22.5 | Methyl methacrylate | 3.5 | | | | | Methacrylic acid | 6.0 |
| I-b-2 | 270 | — | 0 | | | | | Acrylic acid | 8.1 |
| I-b-3 | 6.1 | — | 0 | | | | | " | 3.5 |
| Copolymer I-c | | | | | | | | | |
| I-c-1 | 221 | Methyl methacrylate | 6.5 | 8.6 | 100 | | | | |
| I-c-2 | 109 | " | 6.0 | 17.7 | 100 | | | | |
| I-c-3 | 109 | " | 6.0 | 28.8 | 100 | | | | |
| I-c-4 | 8.0 | " | 5.6 | 16.4 | 100 | | | | |
| I-c-5 | 8.0 | " | 5.6 | 26.8 | 100 | | | | |
| Copolymer I-d | | | | | | | | | |
| I-d-1 | 212 | Maleic anhydride | 1.5 | | | 100 | — | Ethyl acrylate | 9.5 |
| I-d-2 | 210 | " | 1.1 | | | 100 | — | " | 8.3 |
| I-d-3 | 220 | " | 1.6 | | | — | 63 | Methyl methacrylate | 8.7 |
| I-d-4 | 220 | " | 1.6 | | | — | 83 | " | 8.7 |

*1Ratio (%) of saponification of carboxylate with alkali
*2Ratio (%) of neutralization of metal salt with acid to carboxylic acid group
*3Determined according to an ASTM D 1238 method

TABLE 2

| Composition of Adhesive Layer | | Adhesion Condition*1 | | | T-Peel Strength | Heat Resistance*2 | | | | |
|---|---|---|---|---|---|---|---|---|---|---|
| Copolymer | Ratio (%) | Temp. (°C.) | Time (min) | Gelation (%) | (23° C.) (Kg/25 cm) | 200° C. 10 min | 30 min | 250° C. 10 min | 30 min | 300° C. 3 min |
| II-a-4/ I-b- | 50/50 | 160 | 30 | 91.8 | 10.5 | + | + | + | + | + |
| | " | 180 | 10 | 89.5 | 11.3 | + | + | + | + | + |
| | " | 240 | 10 | 98.6 | 7.3 | + | + | + | + | + |
| | 30/70 | 240 | 10 | 97.7 | 7.4 | + | + | + | + | + |
| II-a-3/ I-c-3 | 50/50 | 160 | 30 | 93.4 | 7.6 | + | + | + | + | + |
| | " | 180 | 10 | 92.9 | 7.2 | + | + | + | + | + |
| | " | 240 | 10 | 96.8 | 4.8 | + | + | + | + | + |
| | 20/80 | 240 | 10 | 88.6 | 10.0 | + | + | + | + | ± |
| | 90/10 | 240 | 10 | 70.4 | 9.8 | + | + | ± | ± | ± |
| II-a-4/ I-d-4 | 50/50 | 180 | 10 | 84.8 | 5.6 | + | + | + | + | ± |
| | " | 240 | 10 | 94.5 | 7.0 | + | + | + | + | ± |
| II-a-2/ I-d-2 | 50/50 | 160 | 10 | 98.6 | 10.3 | + | + | + | + | + |
| | | 240 | 10 | 99.6 | 10.7 | + | + | + | + | + |
| | 30/70 | 160 | 10 | 99.5 | 7.9 | + | + | + | + | + |
| | | 240 | 10 | 100.0 | 8.2 | + | + | + | + | + |
| II-a-4 | 100/0 | 180 | 10 | 0 | 18.0 | — | — | — | — | — |
| I-b-2 | 100/0 | 180 | 10 | 0 | 6.0 | — | — | — | — | — |
| I-d-3 | 100/0 | 180 | 10 | 0 | 6.9 | — | — | — | — | — |

*1Aluminum/Adhesive Layer/Aluminum, Adhesive Pressure: 20 Kg/cm²
*2+: No deformation, ±: Some deformation, —: Deformation

EXAMPLES 2 to 7

Various 50:50 mixture compositions of copolymers II-a with copolymers (I-b), (I-c), or (I-d) all listed in Table 1 were prepared by mixing these copolymers in a labo plastomill at a temperature of less than 110° C. for 3 to 4 minutes at a rotor speed of 40 r.p.m.

From the compositions obtained above, sheets having a thickness of 1.5 mm were prepared by rolls having a temperature of 85° C. The thus-obtained sheets were sandwiched between two Teflon sheets and heat pressed at a temperature of 180° C. to 240° C. for 30 minutes to 2 hours under a pressure of 20 kg/cm². Thus, the crosslinked sheets were obtained.

The gelation (%), tensile strength, Izod impact strength (−40° C.), hardness, electrical characteristics (R.H. =53–97%), and volume resistivity after boiling with boiled water for 2 hours, of the crosslinked sheets were determined. The results were as shown in Table 3.

Regarding the glass plates, the sandwiches of glass plate adhesive layer (i.e., copolymer composition film)/aluminum foil were heated without pressure to effect the crosslinking the aluminum foil was used as a support during the peeling test. The cellophane was heated under a pressure of 10 kg/cm$^2$ in the form of the sand-

TABLE 3

| Example No. | | 2 | 3 | 4 | 5 | 6 | 7 |
|---|---|---|---|---|---|---|---|
| Sample No. | | II-a-4/I-b-2 | II-a-2/I-b-2 | II-a-3/I-b-3 | II-a-4/I-c-5 | II-a-1/I-d-1 | II-a-4/I-d-4 |
| Press condition | | 180° C. × 2 hr | 180° C. × 2 hr | 240° C. × 30 min | 240° C. × 30 min | 180° C. × 2 hr | 240° C. × 30 min |
| Gelatin (%) | | 98.2 | 100 | 99.2 | 97.8 | 93.6 | 99.2 |
| Izod Impact Strength −40° C. with notch (Kg-cm/cm) | | 82.6 | 77.6 | 83.2 | 77.6 | 83.3 | 86.7 |
| Stiffness (Kg/cm$^2$) | | 490 | 380 | 530 | 520 | 330 | 360 |
| Volume Resistivity | 21° C. 53% R.H. 24 hr | 3.2 × 10$^{15}$ | 9.8 × 10$^{15}$ | 7.1 × 10$^{16}$ | 2.1 × 10$^{16}$ | 1.1 × 10$^{16}$ | 2.6 × 10$^{16}$ |
| | 21° C. 97% R.H. 24 hr | 2.8 × 10$^{15}$ | 7.6 × 10$^{15}$ | 2.8 × 10$^{16}$ | 1.1 × 10$^{16}$ | 8.1 × 10$^{15}$ | 1.3 × 10$^{16}$ |
| | 21° C. 97% R.H. 550 hr | 2.1 × 10$^{15}$ | 6.8 × 10$^{15}$ | 2.8 × 10$^{16}$ | 9.6 × 10$^{15}$ | 4.1 × 10$^{15}$ | 8.6 × 10$^{15}$ |
| ρ (Ω · cm) | Boiling 2 hr | 3.6 × 10$^{15}$ | 5.3 × 10$^{15}$ | 3.1 × 10$^{16}$ | 8.9 × 10$^{15}$ | 1.1 × 10$^{15}$ | 5.6 × 10$^{15}$ |
| Heat Resistance (250° C.) | | + | + | + | + | + | + |

EXAMPLES 8 to 14

Various 50:50 mixture compositions of copolymers (II-a) with copolymers (I-a), (I-c), or (I-d), listed in Table 1 were prepared. From these compositions, T-die films were prepared in the same manner as in Example 1.

These films were applied to glass, cellophane, 6-nylon, polycarbonate, Bakelite, polyethylene, and polypropylene in the same manner as in Example 1. The films were adhered to the substrates in a press at a temperature of 120° C. to 150° C. for 20 to 30 minutes under pressure or not under pressure in the case of the glass plate. The adhesion strength of the adhered sheets (i.e., 180° peel strength) were determined by using a tension (tensile tester) at a stress rate of 100 mm/min. The adhesion strength and the gelatin (%) results were as shown in Table 4.

wiches of cellophane/adhesive layer/cellophane. The 6-nylon was heated under a pressure of 10 kg/cm$^2$ in the form of the sandwiches of 6-nylon/adhesive layer/aluminum foil. The aluminum foil was used as a support. The polycarbonate and the Bakelite were tested in the same way as mentioned above.

The polyethylene or polypropylene was adhered under a pressure of 10 kg/cm$^2$ upon heating in the form of the sandwich of polyethylene or polypropylene/adhesive layer/polyethylene or polypropylene. The adhesion strength was determined.

The results were as shown in Table 4.

TABLE 4

| Example No. | Substrate | Adhesion Layer | Adhesion Condition (°C.) | (min) | Gelation (%) | Peel Strength (Kg/25 mn) |
|---|---|---|---|---|---|---|
| 8 | Glass | II-a-4/I-b-2 | 150 | 20 | 88.7 | more than 5.1 |
| | | II-a-3/I-c-3 | " | " | 86.4 | more than 4.8 |
| | | II-a-4/I-d-4 | " | " | 73.8 | more than 5.3 |
| 9 | Celophane | II-a-4/I-b-2 | 120 | 30 | 90.2 | 1.6 |
| | | II-a-3/I-c-3 | " | " | 85.2 | 1.9 |
| | | II-a-4/I-d-4 | " | " | 74.2 | 1.3 |
| 10 | 6-Nylon | II-a-4/I-b-2 | 150 | 20 | 88.7 | 7.0 |
| | | II-a-3/I-c-3 | " | " | 86.4 | 7.2 |
| | | II-a-4/I-d-4 | " | " | 73.8 | 8.2 |
| 11 | Polycarbonate | II-a-4/I-b-2 | 120 | 30 | 90.2 | 7.3 |
| | | II-a-3/I-c-3 | " | " | 85.2 | 7.9 |
| | | II-a-4/I-d-4 | " | " | 74.2 | 4.8 |
| 12 | Bakelite | II-a-4/I-b-2 | 120 | 20 | 82.6 | 8.3 |
| | | II-a-3/I-c-3 | " | " | 84.8 | 9.0 |
| | | II-a-4/I-d-4 | " | " | 73.7 | 7.8 |
| 13 | Polyethylene | II-a-4/I-b-2 | 120 | 20 | 82.6 | 11 |
| | | II-a-3/I-c-3 | " | " | 84.8 | 10 |
| | | II-a-4/I-d-4 | " | " | 73.7 | 9 |
| 14 | Polypropylene | II-a-4/I-b-2 | 150 | 20 | 88.7 | 6.6 |
| | | II-a-3/I-c-3 | " | " | 86.4 | 7.8 |
| | | II-a-4/I-d-4 | " | " | 73.8 | 6.7 |

EXAMPLE 15

Polymer compositions were prepared by mixing copolymers (II-a-4) and (I-b-2), copolymers (II-a-3) and (I-c-3), copolymers (II-a-4) and (I-d-4), and copolymers (II-a-2) and (I-d-2) all in a weight ratio of 1:1 at a temperature of 95° C. for 3 minutes in a labo plastomill at 40 r.p.m., while 3% of Cellmic CAP-500 (i.e., Registered Trade Mark) (available from Sankyo Kasei K.K. Japan) was mixed as a foaming agent. The resultant compositions were pressed at a temperature of 110° C. to prepare pressed sheets having a thickness of 1 mm.

When the resultant pressed sheets containing the foaming agent placed on an aluminum foil were heated in an oven at a temperature of 230° C. for 5 minutes, the foamed products having a foaming factor of about 30 times were obtained. The gel content (%) of the resultant foamed products was 83% and the adhesion strength was 6.5 kg/25 mm.

The non-crosslinked pressed sheet containing the foaming agent obtained above was sandwiched between aluminum foils and the resultant laminate was then pressed at a temperature of 110° C. for one minute under a pressure of 5 kg/cm$^2$; thus, the pressed sheets were adhered with two aluminum foils on both surfaces. The thickness of the adhered resin was 0.5 mm. The thus-obtained laminate was heated at a temperature of 230° C. for 5 minutes under ambient pressure in an oven. Thus, the foamed product in the form of a sandwich was obtained. The gel content thereof was more than 89% and the adhesion strength was more than 4.7 kg/25 mm. When these foamed products were placed in an oven having a temperature of 350° C., no deformation and discoloration occurred. Thus, excellent heat resistance was observed.

EXAMPLE 16

The polymer composition containing 3% of Cellmic CAP-500 was prepared by mixing copolymers (II-a-4) and (I-b-2) in a ratio of 1:1. The thus-obtained polymer composition was sandwiched with five kinds of paper in the form of paper/composition/paper. The sandwiched laminates were pressed at a temperature of 110° C. for 1 minute under a pressure of 5 kg/cm$^2$. The pressure sheets were heated at a temperature of 190° C. for 10 minutes under ambient pressure in an oven to form sandwich-type foamed products. The adhesion strength of the foamed product was very strong, for example, the substrate (i.e., paper) was broken without peeling at the adhesion interfaces. No deformation was observed when the foamed product was allowed to stand in air at a temperature of 250° C. or more for one hour or more.

When the foamed product was first prepared, followed by adhering it to the paper, a similar adhesion strength was obtained.

EXAMPLE 17

The non-crosslinked T-die film obtained in Example 1 was adhered to an aluminum foil in a press at a temperature of 230° C. for 10 to 30 minutes or 300° C. for 3 to 10 minutes under a pressure of 5 to 20 kg/cm$^2$. The resultant laminates were sampled in the form of strips having a width of 25 mm. The sample strips were subjected to a heat cycle test in which the sample was first allowed to stand at an elevated temperature of 150° C. to 300° C. for 10 minutes in an oven and then rapidly dipped in a dry-ice-methanol bath at a temperature of −80° C. for 10 minutes. This subsequent operation was repeated 5 to 10 times. Thereafter, the adhesion strength was determined at room temperature. The results were as shown in Table 5.

As is clear from the results shown in Table 5, the adhesion strength did not substantially change and remained strong even after the very severe heat cycle test.

TABLE 5

| Adhesion Condition | Heating Cycle Condition | T-peel Strength (Kg/25 mm) |
|---|---|---|
| 230° C. × 10 min | 150° C. ⇌ −80° C. | 10.50 |
| 230° C. × 30 min | (10 min) (10 min) | 7.32 |
| 300° C. × 3 min | 10 cycle | 7.62 |
| 300° C. × 10 min |  | 6.16 |
| 300° C. × 3 min | 250° C. ⇌ −80° C. | 7.30 |
| 300° C. × 10 min | (10 min) (10 min) 10 cycle | 5.93 |
| 300° C. × 3 min | 300° C. ⇌ −80° C. | 7.33 |
| 300° C. × 10 min | (10 min) (10 min) 5 cycle | 5.83 |

EXAMPLE 18

The T-die film prepared from a 50:50 mixture composition of the copolymers (II-a-4) and (I-d-4) in the same manner as in Example 1 was sandwiched between aluminum foils having a thickness of 100 μm and adhered together in a press at a temperature of 230° C. for 5 minutes under a pressure of 20 kg/cm$^2$. The thus-prepared sandwich type samples were cut into the form of a strip having a width of 25 mm. The sample strips were dipped in boiling water for a maximum of 48 hours.

After the sample strips were allowed to stand for 2 hours in a constant temperature room having a temperature of 21° C. and a relative humidity (R.H.) of 54%, the adhesion strength was determined according to a T-type peeling test method. The adhesion strength after 4 hours and 48 hours dipping was 10.2 and 9.3 kg/25 mm, respectively. The resultant crosslinked products had a constant and very strong adhesion strength irrespective of the dipping time in boiling water.

EXAMPLE 19

A polymer composition was prepared by mixing the copolymers (II-a-4) and (I-d-4) in a mixing ratio of 1:1 at a temperature of 110° C. for 4 minutes at 40 r.p.m. in a labo plastomill, while 3% to 5% of antimony trioxide and 9% to 30% of AFR 1002 (Registered Trade Mark) (azodicarbonamide available from ASAHI GLASS CO., LTD.) were added, as flame retardants, to the composition. The thus-obtained composition was roll milled at a temperature of 100° C. to form a sheet having a thickness of 1.5 mm. The resultant sheet was sandwiched between aluminum foils or between Teflon sheets. Thus, the aluminum sandwiched plate and the crosslinked sheet were obtained by heat pressing at a temperature of 240° C. for 10 minutes under a pressure of 20kg/cm$^2$.

The adhesion strength was determined according to a T-type peeling test method by using the former sample and the temperature dependency of the burning characteristics and electrical characteristics was determined by using the latter sample. The results were as shown in Table 6.

EXAMPLE 20

The polymer composition in example 19 was mixed with 3% of Cellmic CAP-500 in the same manner as in Example 17. The resultant mixture was crosslinked foamed in the same manner as in Example 15. The foaming conditions and the combustibility were evaluated.

The results were as shown in Table 7.

TABLE 6

| Flame Retardant (%) | Press Conditions | Combustibility | Resistivity R.H. (%) | Surface $\sigma$ ($\Omega$) | Volume $\rho$ ($\Omega \cdot$ cm) | T-peel strength Kg/25 mm |
|---|---|---|---|---|---|---|
| AFR1002 (30.0) | 240° C. × 10 min | Non-combustible | — | — | — | 6.6 |
| Sb$_2$O$_3$ (5.0) AFR1002 (15.0) | " | " | — | — | — | 6.3 |
| Sb$_2$O$_3$ (3.0) AFR1002 (9.0) | " | " | 54 88 | 4.12 × 10$^{16}$ 2.86 × 10$^{16}$ | 2.50 × 10$^{14}$ 2.86 × 10$^{14}$ | 6.7 |

TABLE 7

| Flame Retardant (%) | Foaming Agent (%) | Foaming Conditions | Combustibility | T-peel strength (Kg/25 mm) |
|---|---|---|---|---|
| Sb$_2$O$_3$ (3.0) | Cellmic CAP-500 (3.0) | 240° C. × 10 | Non-combustible | 3.6 |
| AFR1002 (9.0) | Cellmic C (3.0) | " | " | 4.1 |

EXAMPLE 21

A 20g amount of the above-mentioned α-olefin copolymer (II-d-1) containing 89 mol % of ethylene, 9.5 mol % of ethyl acrylate, and 1.5 mol % of maleic anhydride was dissolved in 200 ml of toluene and 100 ml of water and 3 times by mol, in terms of the maleic anhydride portion, of triethylamine were added thereto. The resultant mixture was agitated at a temperature of 80° C. for 5 hours. Thereafter, the mixture was neutralized with hydrochloric acid and hydrochlonic acid was further added until the mixture became weakly acidic. The mixture was allowed to stand for one night. Hexane was added to the resultant mixture as a precipitating solvent to precipitate the resultant copolyer. The copolymer was washed several times with hexane and dried in vacuo at a temperature of 40° C. for one night.

The degree of hydrolysis was calculated from the decrease in the absorption at 1760 cm$^{-1}$ corresponding to acid anhydride determined by IR absorption analysis. As a result, the hydrolysis (%) was 100%.

EXAMPLE 22

This example illustrates a half esterification reaction. A 20 g amount of the copolymer (I-d-1) containing 80 mol % of ethylene, 9.5 mol % of ethyl acrylate, and 1.5 mol % of maleic anhydride was dissolved in 200 ml of toluene. A 100 ml amount of methanol and 1 ml of triethylamine were then added to the solution. The resultant mixture was allowed to react under a methanol reflux condition for 6 hours. After the reaction, hexane was added, as a precipitating solvent, to the reaction mixture to precipitate the resultant copolymer. The copolymer was washed several times with hexane. The copolymer was dried in vacuo at a temperature of 40° C. for one night.

The degree of the half esterification was calculated from the decrease in the absorbance at 1760 cm$^{-1}$ corresponding to acid anhydride determined by IR absorption analysis. As a result, 70% of the maleic anhydride was half esterified.

Various copolymers used in the following Examples are listed in Table 8, in which the kinds and amounts of the second and third comonomers and the MI of the copolymers are shown.

TABLE 8

| Copolymer | MI | Second Comonomer Kind | Amount (%) | Third Comonomer Kind | Amount (%) |
|---|---|---|---|---|---|
| Copolymer I-a | | | | | |
| I-a-1 | 105 | Methyl methacrylate | 20.5 | Maleic anhydride | 3.1 |
| 2 | 13 | " | 17.8 | " | 0 |
| 3 | 8.5 | " | 8.0 | " | 3.2 |
| 4 | 212 | Ethyl acrylate | 26.4 | " | 4.1 |
| 5 | >1000 | " | 30.7 | " | 1.7 |
| 6 | 9.0 | " | 24.0 | " | 2.1 |
| 7 | 7.7 | " | 9.4 | " | 2.3 |
| 8 | 97 | Methyl acrylate | 52.0 | " | 4.5 |
| 9 | 310 | Methyl methacrylate | 49.1 | " | 8.5 |
| 10 | 143 | Butyl acrylate | 32.3 | " | 3.4 |
| Copolymer II-b | | | | | |
| II-b-1 | 94 | Methyl methacrylate | 27.5 | Hydroxy methacrylate | 4.3 |
| 2 | 123 | " | 20.7 | " | 11.7 |
| 3 | 51 | " | 7.8 | " | 28.8 |
| 4 | 270 | Ethyl acrylate | 25.4 | " | 15.6 |
| 5 | 500 | " | 18.8 | " | 9.5 |
| 6 | 250 | Methyl methacrylate | 25.7 | Allyl alcohol | 7.4 |
| 7 | >1000 | " | 16.3 | " | 18.7 |
| 8 | 47 | Vinyl acetate | 0 | Vinyl alcohol | 4.8 |
| 9 | 92 | " | 5 | " | 17.5 |
| 10 | 220 | " | 0 | " | 14.5 |
| Copolymer II-a | | | | | |
| II-a-5 | 137 | Methyl methacrylate | 26.7 | Glycidyl methacrylate | 5.9 |
| 6 | 97 | " | 18.6 | " | 12.7 |

TABLE 8-continued

|  |  | Second Comonomer | | Third Comonomer | |
| --- | --- | --- | --- | --- | --- |
| Copolymer | MI | Kind | Amount (%) | Kind | Amount (%) |
| 7 | 200 | Ethyl acrylate | 15.4 | " | 25.3 |
| 8 | 330 | " | 25.6 | Glycidyl acrylate | 7.5 |
| 9 | 84 | Methyl acrylate | 14.7 | " | 15.4 |
| 10 | 250 | Butyl acrylate | 5.2 | " | 32.3 |
| 11 | >500 | " | 15.6 | " | 13.2 |

TABLE 9

| Composition of Adhesive Layer | | Adhesion Conditions*1 | | Gel content (%) | T-peel strength (Kg/25 mm) | Heat Resistance*2 | | | | |
| --- | --- | --- | --- | --- | --- | --- | --- | --- | --- | --- |
| | | | | | | 200° C. | | 250° C. | | 300° C. |
| Copolymer | Ratio (%) | Temp. (°C.) | Time (min) | | | 10 min | 30 min | 10 min | 30 min | 3 min |
| I-a-4/II-b-9 | 50/50 | 230 | 1 | 79.3 | 8.52 | + | + | + | + | + |
| " | " | " | 5 | 88.5 | 8.86 | + | + | + | + | + |
| " | " | " | 10 | 89.6 | 8.11 | + | + | + | + | + |
| " | " | " | 20 | 91.3 | 5.83 | + | + | + | + | + |
| | 80/20 | 230 | 20 | 88.2 | 5.07 | + | + | + | + | ± |
| | 90/10 | 230 | 20 | 72.6 | 7.89 | + | + | + | + | + |
| | 95/5 | 230 | 20 | 70.1 | 7.67 | + | + | + | + | ± |
| | 80/20 | 170 | 20 | 73.3 | 6.06 | + | + | + | ± | |
| | 50/50 | 170 | 20 | 84.8 | 5.12 | + | + | + | + | + |
| I-a-4 | 100 | 230 | 5 | 0 | 10.2 | − | − | − | − | − |
| II-b-4 | 100 | 230 | 5 | 0 | 1.14 | − | − | − | − | − |
| I-a-2/II-b-4 | 50/50 | 230 | 20 | 0 | 3.24 | − | − | − | − | − |

*1Al/Adhesive layer/Al at 20 kg/cm$^2$
*2+: No change
±: Some deformation
−: Deformation

EXAMPLE 23

The 50:50, 80:20, and 95:5 mixture compositions of copolymers (I-a-4) and (II-b-9) were obtained in the same manner as in Example 1. The films of these compositions were prepared in the same manner as in Example 1 and the resultant films were adhered to aluminum foils in the same manner as in Example 1.

The adhesion strength and gelation (%) of the resultant adhered plates at room temperature were as shown in Table 9. Furthermore, the adhered plates obtained in the same manner as mentioned above were dipped in a molten solder bath in the same conditions as mentioned in Example 1. The conditions of the films after dipping were as shown in Table 9.

EXAMPLES 24 to 28

Various 50:50 mixture compositions of the copolymers (I-a) and (II-b) listed in Table 8 were prepared by mixing these copolymers at a temperature of less than 110° C. for 3 to 4 minutes at a rotor speed of 40 r.p.m. in a labo plastomill. The sheets of these copolymers having a thickness of 1.5 mm were prepared at a temperature of 85° C. in rolls. These sheets were sandwiched between Teflon sheets and were crosslinked at a temperature of 190° C. to 230° C. for 30 minutes to 2 hours under a pressure of 20 kg/cm$^2$ in a press.

The data of the gel content (%), tensile strength, Izod impact strength at −40° C., hardness, electrical characteristics at R.H. of 53 to 97%, and volume resistivity after treating with boiling water for 2 hours were as shown in Table 10.

TABLE 10

| Example No. | | 24 | 25 | 26 | 27 | 28 |
| --- | --- | --- | --- | --- | --- | --- |
| Copolymer Composition | | I-a-10/II-b-6 | I-a-6/II-b-2 | I-a-4/II-b-9 | I-a-1/II-b-10 | I-a-7/II-b-5 |
| Pressing Conditions | | 190° C. × 2 Hr | 190° C. × 2 Hr | 230° C. × 30 min | 230° C. × 30 min | 230° C. × 30 min |
| Gel Content (%) | | 59.0 | 89.6 | 92.7 | 90.5 | 84.0 |
| Izod Impact (kg-cm/cm) | −40° C. | 87.2 | 86.1 | 99.4 | 73.4 | 95.4 |
| Stiffness (kg/cm$^2$) | | 330 | 450 | 550 | 1240 | 1090 |
| Volume Resistivity $\rho$ ($\Omega \cdot$ cm) | 21° C., RH53%, 24 Hr | 3.5 × 10$^{15}$ | 3.3 × 10$^{16}$ | 6.8 × 10$^{16}$ | 2.2 × 10$^{16}$ | 2.3 × 10$^{16}$ |
| | 21° C., RH97%, 24 Hr | 2.3 × 10$^{15}$ | 1.8 × 10$^{15}$ | 1.2 × 10$^{14}$ | 1.1 × 10$^{16}$ | 1.1 × 10$^{16}$ |
| | 21° C., RH97%, 550 Hr | 2.1 × 10$^{15}$ | 1.8 × 10$^{16}$ | 1.2 × 10$^{16}$ | 1.0 × 10$^{16}$ | 1.3 × 10$^{16}$ |
| | 2 Hr Boiling | 5.5 × 10$^{15}$ | 5.3 × 10$^{15}$ | 3.1 × 10$^{15}$ | Impossible to determine deformation | 2.3 × 10$^{15}$ |
| Heat Resistance*1 (250° C.) | | + | + | + | + | + |

*1 +No change, ± Same deformation, − Deformation

EXAMPLES 29 to 34

The T-die films of various 50:50 mixture compositions of the copolymers (I-a) and (II-b) were prepared in the same manner as in Example 1 and these films were adhered to glass, cellophane, and polyurethane sheets at a temperature of 170° C. to 230° C. for 10 to 20 minutes under pressure (in the case of the cellophane and polyurethane) or not under pressure (in the case of the glass) in a press in the same manner as in Example 1.

The adhesion strength (i.e., 180° peel strength) of the adhered products was determined by a tensilon tension tester at a stress rate of 100 mm/min. The adhesion strength and gel content (%) of the adhered products were as shown in Table II.

Regarding the glass plates, the sandwiches of glass plate adhesive layer (i.e., copolymer composition film)/aluminum foil were heated without pressure to effect the crosslinking. The aluminum foil was used as a support during the piling test. The cellophane was heated under a pressure of 20 kg/cm$^2$ in the form of the sandwiches of cellophane/adhesive layer/cellophane. The polyurethane was heated under a pressure of 20 kg/cm$^2$ in the form of the sandwiches of polyurethane/adhesive layer/aluminum foil. The aluminum foil was used as a support.

TABLE 11

| Example | Substrate to be adhered | Adhesive Layer | Adhesion Conditions (°C.) | (min) | Gel Content (%) | Peel Strength (Kg/25 mm) |
|---|---|---|---|---|---|---|
| 29 | Glass | I-a-5/II-b-2 | 230 | 10 | 85 | 5.1 |
| 30 | " | I-a-8/II-b-2 | " | " | 92 | 4.5 |
| 31 | Cellophane | I-a-3/II-b-3 | 190 | 10 | 77 | 3.8 |
| 32 | " | I-a-4/II-a-9 | " | " | 89 | 5.4 |
| 33 | Polyurethane | I-a-9/II-b-6 | 170 | 20 | 83 | 11.7 |
| 34 | " | I-a-10/II-b-4 | " | " | 68 | 4.9 |

EXAMPLE 35

Polymer compositions were prepared by mixing copolymers (I-a-8) and (II-b-4) and copolymers (I-a-4), (II-b-5) both in a weight ratio of 1:1 at a temperature of 95° C. for 3 minutes in a labo plastomill at 40 r.p.m., while 3% of Cellmic CAP-500 (available from Sankyo Kasei K.K. Japan) was mixed as a foaming agent. The resultant compositions were pressed at a temperature of 110° C. to prepare pressed sheets having a thickness of 1 mm.

When the resultant pressed sheets containing the foaming agent placed on an aluminum foil were heated in an oven at a temperature of 230° C. for 5 minutes, foamed products having a foaming factor of about 30 times were obtained. The gel content of the resultant foamed products was 83% and the adhesion strength was 6.5 kg/25 mm.

The non-crosslinked pressed sheet containing the foaming agent obtained above was sandwiched between aluminum foils and the resultant laminate then pressed at a temperature of 110° C. for one minute under a pressure of 5 kg/cm$^2$, thus the pressed sheet was adhered with two aluminum foils on both surfaces. The thickness of the adhered resin was 0.5 mm. The thus-obtained laminate was heated at a temperature of 230° C. for 5 minutes under ambient pressure in an oven. Thus, the foamed product in the form of a sandwich was obtained. The gel content(%) thereof was more than 87% and the adhesion strength was more than 4.9 kg/25 mm. When these foamed products were placed in an oven having a temperature of 350° C., no deformation and discoloration occurred. Thus, excellent heat resistance was observed.

EXAMPLE 36

The polymer composition containing 3% of Cellmic CAP-500 was prepared by mixing copolymers (I-a-4) and (II-b-2), in a ratio of 1:1 in a labo plastomill in the same manner as in Example 35. The thus-obtained polymer composition was sandwiched with five kinds of paper in the form of paper/composition/paper. The sandwiched laminates were pressed at a temperature of 110° C. for 1 minute under a pressure of 5 kg/cm$^2$.

The pressed sheets were heated at a temperature of 190° C. for 10 minutes under 1 atm. in an oven to form sandwich type foamed products. The adhesion strength of the foamed product was very strong, for example, the substrate (i.e., paper) was broken without peeling at the adhesion interfaces. No deformation was observed when the foamed product was allowed to stand in the air at a temperature of 250° C. or more for one hour or more.

When the foamed product was first prepared, followed by adhering it to the paper, a similar adhesion strength was obtained.

EXAMPLE 37

The non-crosslinked T-die film obtained in Example 23 was adhered to as aluminum foil in a press at a temperature of 230° C. for 10 to 30 minutes or 300° C. for 3 to 10 minutes under a pressure of 5 to 20 kg/cm$^2$. The resultant laminates were sampled in the form of strips having a width of 25 mm. The sample strips were subjected to a heat cycle test in which the sample was first allowed to stand at an elevated temperature of 150° C. to 300° C. for 10 minutes in an oven and then rapidly dipped in a dry-ice-methanol bath at a temperature of $-80°$ C. for 10 minutes. This subsequent operation was repeated 5 to 10 times. Thereafter, the adhesion strength was determined at room temperature. The results were as shown in Table 12.

As is clear from the results shown in Table 12, the adhesion strength did not substantially change and remained strong even after the very severe heat cycle test.

TABLE 12

| Adhesion Condition | Heating Cycle Condition | T-peel Strength (Kg/25 mm) |
|---|---|---|
| 230° C. × 10 min | 150° C. ⇌ −80° C. | 7.16 |
| 230° C. × 30 min | (10 min) (10 min) | 2.94 |
| 300° C. × 3 min | 10 cycle | 7.62 |
| 300° C. × 10 min | | 5.64 |
| 300° C. × 3 min | 250° C. ⇌ −80° C. | 7.30 |
| 300° C. × 10 min | (10 min) (10 min) 10 cycle | 5.85 |
| 300° C. × 3 min | 300° C. ⇌ −80° C. | 7.33 |
| 300° C. × 10 min | (10 min) (10 min) 5 cycle | 5.12 |

EXAMPLE 38

The T-die film prepared from a 50:50 mixture composition of the copolymers (I-a-4) and (II-b-10) in the same manner as in Example 1 was sandwiched between aluminum foils having a thickness of 100 μm and adhered together in a press at a temperature of 230° C. for 5 minutes under a pressure of 20 kg/cm$^2$. The thus-prepared sandwich type samples were cut into the form of a strip having a width of 25 mm. The sample strips were dipped in boiling water for a maximum of 48 hours.

foamed in the same manner as in Example 35. The foaming conditions and the combustibility were evaluated. The results were as shown in Table 14.

TABLE 13

| Flame Retardant (%) | Press Conditions | Combustibility | Resistivity | | | T-peel strength Kg/25 mm |
|---|---|---|---|---|---|---|
| | | | R.H. (%) | Surface $\sigma$ ($\Omega$) | Volume $\rho$ ($\Omega \cdot$ cm) | |
| AFR1002 (30.0) | 230° C. × 10 min | Non-combustible | — | — | — | 8.3 |
| $Sb_2O_3$ (5.0) AFR1002 (15.0) | " | " | — | — | — | 7.5 |
| $Sb_2O_3$ (3.0) AFR1002 (9.0) | " | " | 54 88 | $3.28 \times 10^{16}$ $1.26 \times 10^{16}$ | $1.83 \times 10^{14}$ $1.39 \times 10^{14}$ | 6.7 |

TABLE 14

| Flame Retardant (%) | Foaming Agent (%) | Foaming Conditions | Combustibility | T-peel strength (Kg/25 mm) |
|---|---|---|---|---|
| $Sb_2O_3$ (3.0) | Cellmic CAP-500 (3.0) | 230° C. × 10 | Non-combustible | 2.8 |
| AFR1002 (9.0) | Cellmic C (3.0) | " | " | 2.4 |

After the sample strips were allowed to stand for 2 hours in a constant temperature room having a temperature of 21° C. and a relative humidity (R.H.) of 54%, the adhesion strength was determined according to a T-type peeling test method. The adhesion strength after 4 hours and 48 hours dipping was 11.6 and 10.2 kg/25 mm, respectively. The resultant crosslinked products had a constant and very strong adhesion strength irrespective of the dipping time in boiling water.

EXAMPLE 39

A polymer composition was prepared by mixing the copolymers (I-a-4) and (II-b-10), in a mixing ratio of 1:1 at a temperature of 110° C. for 4 minutes at 40 r.p.m. in a labo plastomill, while 3% to 5% of antimony trioxide and 9% to 30% of AFR 1002 (available from ASAHI GLASS CO., LTD.) were added, as flame retardants, to the composition. The thus-obtained composition was roll milled at a temperature of 100° C. to form a sheet having a thickness of 1.5 mm. The resultant sheet was sandwiched between aluminum foils or between Teflon sheets. Thus, the aluminum sandwiched plate and the crosslinked sheet were obtained by heat pressing at a temperature of 230° C. for 20 minutes under a pressure of 20 kg/cm².

The adhesion strength was determined according to T-type peeling method by using the former sample and the temperature dependence of the burning characteristics and electrical characteristics was determined by using the latter sample according to an ASTM D-635 method. The results were as shown in Table 13.

EXAMPLE 40

The polymer composition in Example 39 was mixed with 3% of Cellmic CAP-500 in the same manner as in Example 39. The resultant mixture was crosslinked

EXAMPLE 41

The 50:50, 70:30, 80:20, and 90:10 mixture compositions of copolymers I-a-4 and II-a-6 listed in Table 8 and the films obtained therefrom were prepared in the same manner as in Example 23.

The adhesion strength (i.e., T-peel strength), gel content, and heat resistance of the films were determined under the conditions listed in Table 15 in the same manner as in Example 23.

The results were as shown in Table 15.

EXAMPLES 42 to 44

The crosslinked sheets of the 50:50 mixture composition of the copolymers (I-a) and (II-a) were prepared in the same manner as in Examples 24 to 28.

The data of the gel content, Izod impact strength at −40° C., stiffness, hardness (i.e., Shore D), electrical characteristics at R.H. of 53 to 97%, and volume resistivity after treating with boiling water for 2 hours, of the crosslinked sheets were as shown in Table 16.

EXAMPLES 45 to 50

The T-die films of the various 50:50 mixture compositions of the copolymers (I-a) and (II-a) were formed in the same manner as mentioned in Example 23.

These films were adhered to glass, cellophane, and polyurethane sheets at a temperature of 120° C., 150° C., or 170° C. for 20 to 30 minutes under pressure (in the case of the cellophane and polyurethane) or not under pressure (in the case of the glass) in a press in the same manner as in Example 23.

The gel content and the adhesion strength of the adhered products were determined in the same manner as in Examples 29 to 34.

The results were as shown in Table 17.

TABLE 15

| Composition of Adhesive Layer | | Adhesion Conditions*1 | | Gel content (%) | T-peel strength (Kg/25 mm) | Heat Resistance*2 | | | | |
|---|---|---|---|---|---|---|---|---|---|---|
| | | | | | | 200° C. | | 250° C. | | 300° C. |
| Copolymer | Ratio (%) | Temp. (°C.) | Time (min) | | | 10 min | 30 min | 10 min | 30 min | 3 min |
| I-a-4/II-a-6 | 50/50 | 240 | 1 | 61.3 | 10.6 | + | + | + | + | ± |
| " | " | " | 10 | 70.6 | 11.2 | + | + | + | + | + |
| " | " | " | 20 | 76.8 | 10.9 | + | + | + | + | + |
| " | 70/30 | 240 | 10 | 81 | 9.2 | + | + | + | + | + |
| " | " | " | 30 | 87 | 8.6 | + | + | + | + | + |

TABLE 15-continued

| Composition of Adhesive Layer | | Adhesion Conditions[*1] | | Gel content | T-peel strength | Heat Resistance[*2] | | | | |
|---|---|---|---|---|---|---|---|---|---|---|
| | | | | | | 200° C. | | 250° C. | | 300° C. |
| Copolymer | Ratio (%) | Temp. (°C.) | Time (min) | (%) | (Kg/25 mm) | 10 min | 30 min | 10 min | 30 min | 3 min |
| | 80/20 | 240 | 10 | 75.9 | 10.5 | + | + | + | + | + |
| | 90/10 | 240 | 10 | 62.4 | 10.2 | + | + | + | ± | − |
| I-a-4 | 100 | 230 | 5 | 0 | 10.2 | − | − | − | − | − |
| II-a-6 | 100 | 230 | 5 | 0 | 18.3 | − | − | − | − | − |
| I-a-2/II-a-8 | 50/50 | 230 | 20 | 0 | 11.8 | − | − | − | − | − |

[*1] Al/Adhesive layer/Al at 20 kg/cm$^2$
[*2] + ... No change, ± ... Some deformation, − ... Deformation

TABLE 16

| Example No. | | 42 | 43 | 44 |
|---|---|---|---|---|
| Copolymer Composition | | I-a-1/II-a-6 | I-a-4/II-a-6 | I-a-4/II-a-9 |
| Press Condition | | 240° C. × 10 min | 240° C. × 10 min | 190° C. × 2 hr. |
| Gel Content (%) | | 69.8 | 70.6 | 90.5 |
| Izod Impact (kg · cm/cm) | | 82.3 | 83.3 | 77.8 |
| Stiffness (Kg/cm$^2$) | −40° C. | 330 | 370 | 390 |
| Volume Resistivity $\rho$ ($\Omega \cdot$ cm) | 21° C., R.H. = 53% 24 hr | $3.3 \times 10^{15}$ | $8.8 \times 10^{15}$ | $1.1 \times 10^{16}$ |
| | 21° C., R.H. = 97% 24 hr | $2.6 \times 10^{15}$ | $5.9 \times 10^{15}$ | $9.2 \times 10^{15}$ |
| | 21° C., R.H. = 97% 550 hr | $2.1 \times 10^{15}$ | $4.6 \times 10^{15}$ | $8.3 \times 10^{15}$ |
| | Boiling 2 hr | $2.7 \times 10^{15}$ | $3.9 \times 10^{15}$ | $7.9 \times 10^{15}$ |
| Heat Resistance (250° C.)[*1] | | + | + | + |
| Hardness (Shore D) | | 29 | 33 | 36 |

[*1] + ... No change, ± ... Some deformation, − ... Deformation

TABLE 17

| Example | Substrate to be adhered | Adhesive Layer | Adhesion Conditions (°C.) | (min) | Gel Content (%) | Peel Strength (Kg/25 mm) |
|---|---|---|---|---|---|---|
| 45 | Glass | I-a-1/II-a-6 | | | 73.8 | 5.3 |
| | | | 150 | 20 | | |
| 46 | " | I-a-4/II-a-6 | | | 75.2 | 5.3 |
| 47 | Cellophane | I-a-3/II-a-8 | | | 58.3 | 1.6 |
| | | | 120 | 30 | | |
| 48 | " | I-a-1/II-a-6 | | | 68.2 | 1.9 |
| 49 | Polyurethane | I-a-4/II-a-8 | | | 72.4 | 5.3 |
| | | | 170 | 20 | | |
| 50 | " | I-a-10/II-a-11 | | | 71.5 | 3.8 |

EXAMPLE 51

A polymer composition was prepared by mixing copolymers (I-a-4) and (II-a-6) in a weight ratio in the same manner as in Example 35 of 1:1 for 3 minutes, while 3% of Cellmin CAP-500 (available from Sankyo Kasei K.K. Japan) was mixed as a foaming agent. The resultant compositions were pressed at a temperature of 110° C. to prepare pressed sheets having a thickness of 1 mm.

When the resultant pressed sheets containing the foaming agent placed on an aluminum foil were heated in an oven at a temperature of 230° C. for 5 minutes, foamed products having a foaming factor of about 25 times were obtained. The gel content (%) of the resultant foamed products was 71.2% and the adhesion strength was 5.5 kg/25 mm.

The non-crosslinked pressed sheet containing the foaming agent obtained above was sandwiched between aluminum foils and the resultant laminate then pressed at a temperature of 110° C. for one minute under a pressure of 5 kg/cm$^2$, thus the pressed sheet was adhered with two aluminum foils on both surfaces. The thickness of the adhered resin was 0.6 mm. The thus-obtained laminate was heated at a temperature of 210° C. for 2 minutes under ambient pressure in an oven. Thus, the foamed product in the form of a sandwich was obtained. The gel content thereof was more than 56.5% and the adhesion strength was 3.8 kg/25 mm. When these foamed products were placed in an oven having a temperature of 350° C., no deformation and discoloration occurred. Thus, excellent heat resistance was observed.

EXAMPLE 52

The non-crosslinked T-die film obtained in Example 41 was subjected to a heat cycle test in the same manner as in Example 37. Thereafter, the adhesion strength of the film was determined at room temperature (21° C.).

The results were as shown in Table 18.

As is clear from the results shown in Table 18, the adhesion strength did not substantially change and remained strong even after the very severe heat cycle test.

EXAMPLE 53

The T-die film of the 50:50 mixture composition of the copolymers (I-a-4) and (II-a-7) was formed in the same manner as in Example 23 and was dipped in boiling water for a maximum of 48 hours in the same manner as in Example 38.

After the sample strips were allowed to stand for 2 hours in a constant temperature room having a temperature of 21° C. and a relative humidity (R.H.) of 54%, the adhesion strength was determined according to a T-type peeling test method. The adhesion strength after 4 hours and 48 hours dipping was 10.8 and 9.6 kg/25 mm, respectively. The resultant crosslinked products had a constant and very strong adhesion strength irrespective of the dipping time in boiling water.

EXAMPLE 54

The flame retardant was compounded into the 50:50 mixture composition of the copolymers (I-a-4) and (II-a-7) in the same manner as in Example 39.

The adhesion strength and the temperature dependency of the burning characteristics and electrical characteristics of the resultant compositions were determined. The results were as shown in Table 19.

EXAMPLE 55

A 3% amount of Cellmic CAP-500 used above was added to the composition of Example 54 in the same manner as in Example 54. The resultant composition was crosslinked foamed in the same manner as in Example 35. The evaluation results of the foamed conditions and the combustibility were as shown in Table 20.

TABLE 18

| Adhesion Conditions | Heat Cycle Conditions | T-Peel Strength (Kg/25 mm) |
|---|---|---|
| 230° C. × 10 min | 150° C.   −80° C. | 11.2 |
| 230° C. × 30 min | (10 min)  (10 min) | 7.8 |
| 300° C. × 3 min | 10 cycle | 6.2 |
| 300° C. × 10 min |  | 5.7 |
| 300° C. × 3 min | 250° C.   −80° C. | 5.9 |
| 300° C. × 10 min | (10 min)  (10 min) | 6.1 |
|  | 10 cycle |  |
| 300° C. × 3 min | 300° C.   −80° C. | 5.8 |
| 300° C. × 10 min | (10 min)  (10 min) | 5.6 |
|  | 5 cycle |  | pressed at a temperature of 120° C. for one minute under a pressure of 10 kg/cm² to obtain a non-crosslinked film having a thickness of about 50 μm (i.e., "film (I)").

The film (I) was pressed at a temperature of 240° C. for 10 minutes under a pressure of 10 kg/cm² to obtain a crosslinked film having a thickness of approximately 70 μm (i.e., "film (II)").

On the other hand, the copolymer (I-b-2) was pressed at a temperature of 240° C. for 5 minutes under a pressure of 10 kg/cm² in a press to obtain a film in the form of a wedge having a thickness of 10 to 50 μm (i.e., "film (III)").

In order to determine the infrared absorption spectra, the film (III) was placed in a reference side and the film (I) or (II) was placed in a sample side in an infrared absorption spectrum apparatus Type IR-A3 (manufactured by Nippon Bunko K.K.) and the absorbance at 940 cm$^{-1}$ derived from the carboxyl group (—COOH) of the copolymer I-b-2 in the film (I) or (II) was completely compensated and made zero by appropriately moving the film (III).

Figure 2:
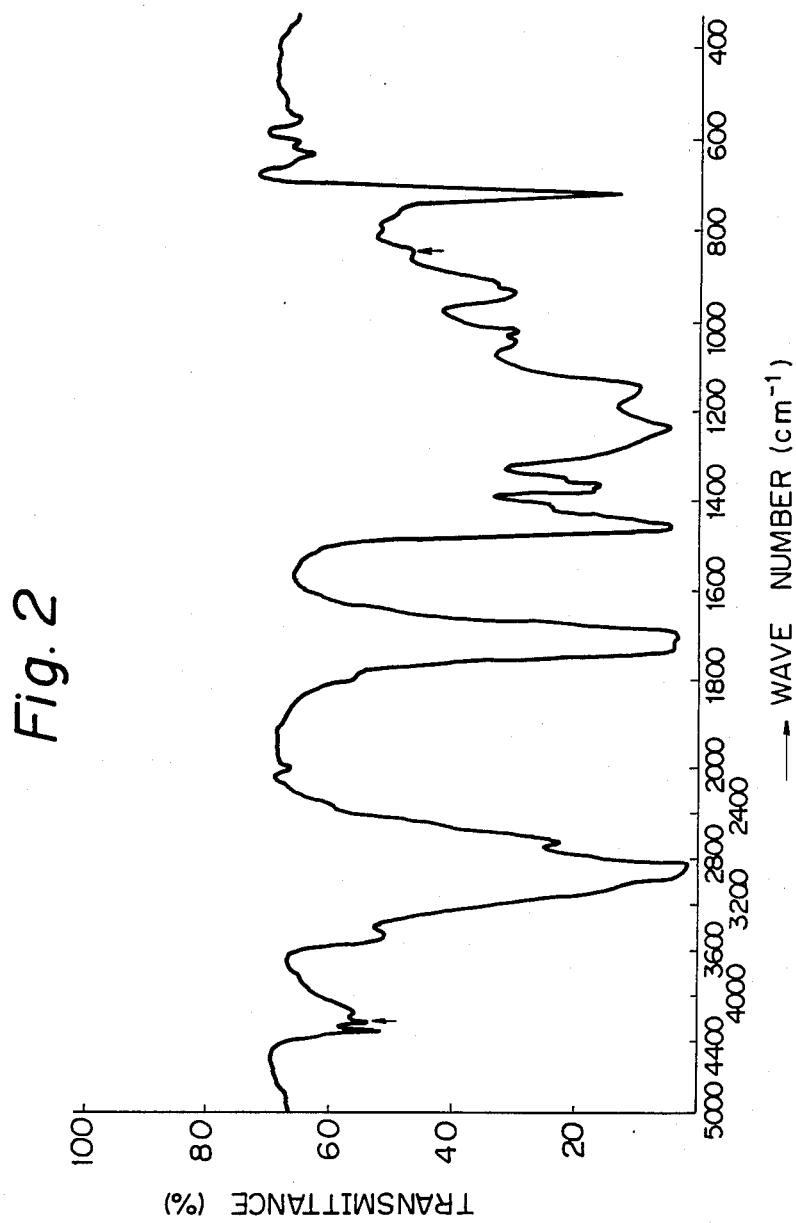
FIG. 2 is an infrared absorption spectrum of the crosslinked film of the mixture of FIG. 1.

The infrared spectrum charts of the film (I) (i.e., non-crosslinked film) or (II) (i.e., crosslinked film) were as shown in FIGS. 1 and 2, respectively. The absorption amount of the epoxy group in this condition was calculated by using the absorbance of methylene at 4250 cm$^{-1}$ as an internal standard as follows.

(i) Non-crosslinked film (I)

$$C_I = I_a^I / I_b^I$$

(ii) Crosslinked film (II)

$$C_{II} = I_a^{II} / I_b^{II}$$

Wherein $C_I$ and $C_{II}$ are the amounts proportional to the concentrations of the epoxy group before and after crosslinking, respectively, $I_a^I$ and $I_a^{II}$ are absorbances at 850 cm$^{-1}$ of the films (I) and (II), respectively, and $I_b^I$ and $I_b^{II}$ are absorbances at 4250 cm$^{-1}$ of the films (I) and (II), respectively.

The conversion can be calculated from $[(C_I - C_{II})/C_I] \times 100$. As a result of FIGS. 1 and 2, it was confirmed that 82% of the epoxy group of glycidyl methacrylate was subjected to the crosslinking reaction.

The copolymers (I-a-4) and (II-a-6) listed in Table 8

TABLE 19

| Flame Retardant (%) | Press Conditions | Combustibility | Resistivity | | | T-Peel Strength |
|---|---|---|---|---|---|---|
| | | | R.H. (%) | Surface σ (Ω) | Volume ρ (Ω · cm) | Kg/25 mm |
| AFR1002 (30.0) | 230° C. × 10 min | Non-Combustible | — | — | — | 7.8 |
| Sb₂O₃ (5.0) AFR1002 (15.0) | " | " | — | — | — | 8.1 |
| Sb₂O₃ (3.0) AFR1002 (9.0) | " | " | 55 | 2.4 × 10¹⁶ | 9.8 × 10¹⁴ | 7.2 |
| | | | 90 | 1.9 × 10¹⁶ | 8.7 × 10¹⁴ | |

TABLE 20

| Flame Retardant (%) | Foaming Agent (%) | Foaming Conditions | Combustibility | T-Peel Strength (Kg/25 mm) |
|---|---|---|---|---|
| Sb₂O₃ (3.0) | Cellmic CAP-500 (3.0) | 200° C. × 2 min | Non-Combustible | 3.6 |
| AFR1002 (9.0) | Cellmic C (3.0) | " | " | 3.1 |

The copolymers II-a-4 and I-b-2 listed in Table 1 were mixed in a weight ratio of 50/50 at a temperature of 110° C. in an extruder to prepare pellets of the resultant compositions. The resultant composition was were mixed in a weight ratio of 50/50 and the pellets (i.e., composition) was prepared in the same manner as mentioned above. From these pellets, non-crosslinked film (i.e., "film (IV)") and crosslinked film (i.e., "film (V)") were prepared in the same manner as mentioned above.

Figure 3:
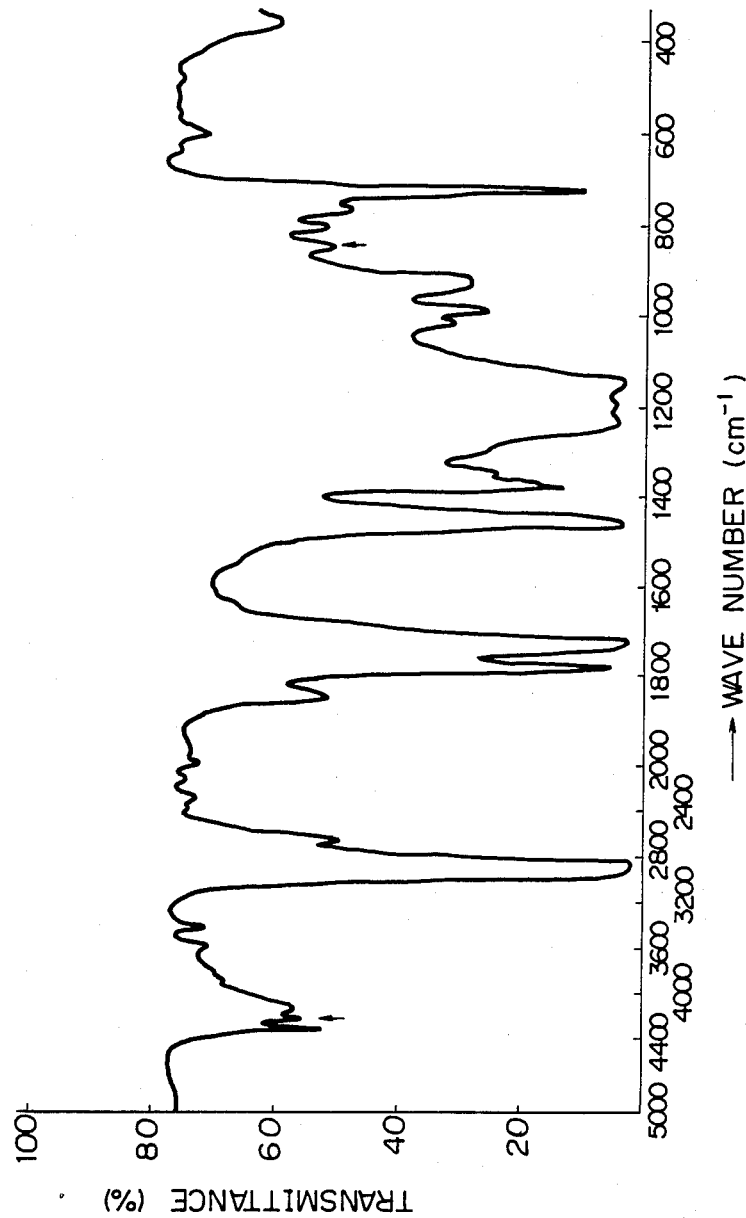
FIG. 3 is an infrared absorption spectrum of the non-crosslinked film of a mixture of copolymer I-a-4 and II-a-6.
Figure 4:
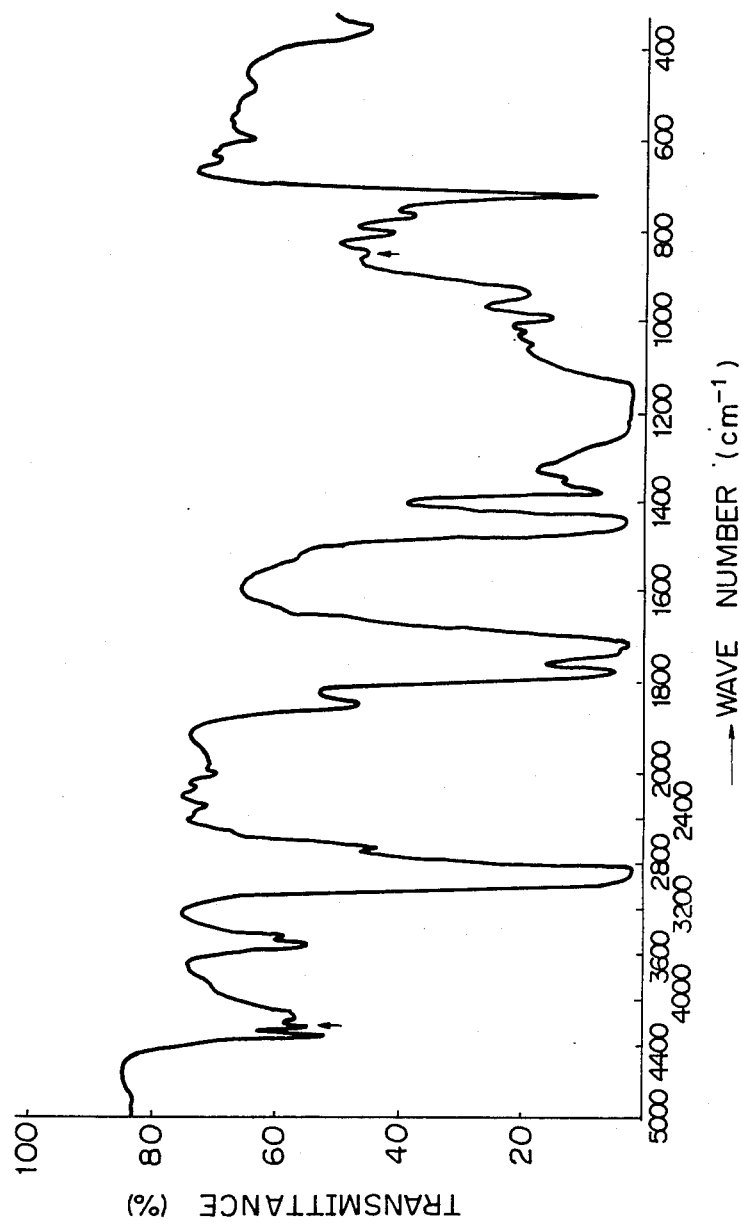
FIG. 4 is an infrared absorption spectrum of the crosslinked film of the mixture of FIG. 3.

The infrared absorption specta of these films (IV) and (V) were as shown in FIGS. 3 and 4, respectively.

I claim:

1. A crosslinked product of a polymer composition comprising:
   (I) 5% to 95% by weight of at least one olefin copolymer having a softening temperature or normal crystalline melting point of 100° C. or less selected from the group consisting of:
      (A) copolymers composed of (i) α-olefines, (ii) unsaturated dicarboxylic acid anhydrides, and (iii) at least one compound selected from the group consisting of unsaturated carboxylic acid esters, and vinyl esters;
      (B) copolymers at least composed of olefins and unsaturated monocarboxylic acids;
      (C) copolymers obtained by saponifying and neutralizing olefin copolymers at least composed of olefins and unsaturated carboxylic esters; and
      (D) copolymers at least composed of olefins and unsaturated dicarboxylic acids or the half esters thereof; and
   (II) 95% to 5% by weight of at least one olefin copolymer having a softening temperature or normal crystalline melting point of 100° C. or less selected from the group consisting of:
      (A) copolymers at least composed of olefins and glycidyl alkyl (meth) acrylates; and
      (B) copolymers composed of (i) at least one α-olefin, (ii) at least one compound selected from the group consisting of unsaturated carboxylic acid esters and vinyl esters, and (iii) at least one compound having a hydroxyl group or primary or secondary amino group in the side chain;
   the gel content of the crosslinked product being 70% or more.

2. A crosslinked product as claimed in claim 1, wherein the olefins are those having 2 to 12 carbon atoms.

3. A crosslinked product as claimed in claim 2, wherein the olefins are ethylene, propylene, and butene-1.

4. A crosslinked product as claimed in claim 1, wherein the unsaturated dicarboxylic acid anhydrides are maleic anhydride, tetrahydrophthalic anhydride, 4-methylcyclohexa-4-ene-1,2-carboxylic acid anhydride, and bicyclo(2,2,1)hepta-5-ene-2,3-dicarboxylic anhydride.

5. A crosslinked product as claimed in claim 1, wherein the unsaturated carboxylic acid esters are methyl acrylate, ethyl acrylate, methyl methacrylate, and ethyl methacrylate.

6. A crosslinked product as claimed in claim 1, wherein the vinyl esters are vinyl acetate and vinyl propionate.

7. A crosslinked product as claimed in claim 1, wherein the unsaturated monocarboxylic acids are acrylic acid, methacrylic acid, and ethacrylic acid.

8. A crosslinked product as claimed in claim 1, wherein the unsaturated dicarboxylic acids are maleic acid, tetrahydrophthalic acid, 4-methylcyclohexa-4-ene,1,2-dicarboxylic acid, and bicyclo(2,2,1)-hepta-5-ene-2,3-dicarboxylic acid.

9. A crosslinked product as claimed in claim 1, wherein the glycidyl alkyl (meth) acrylates are those having the general formula:

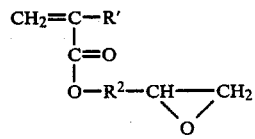

wherein R' is H or methyl and $R^2$ is a linear or branched alkyl group having 1 to 12 carbon atoms.

10. A crosslinked product as claimed in claim 1, wherein the compounds having a hydroxyl group are hydroxymethyl (meth) acrylate, hydroxyethyl (meth) acrylate, hydroxypropyl (meth) acrylate, hydroxybutyl (meth) acrylate, allyl alcohol, and vinyl alcohol.

11. A crosslinked product as claimed in claim 1, wherein the compounds having a primary or secondary amino group are allyl amine, aminoethyl acrylate, and aminoethyl methacrylate.

* * * * *